US012694289B2

(12) United States Patent
Manolakos et al.

(10) Patent No.: US 12,694,289 B2
(45) Date of Patent: Jul. 28, 2026

(54) NEURAL NETWORK OR LAYER CONFIGURATION INDICATOR FOR A CHANNEL STATE INFORMATION SCHEME

(71) Applicant: QUALCOMM INCORPORATED, San Diego, CA (US)

(72) Inventors: Alexandros Manolakos, Escondido, CA (US); Pavan Kumar Vitthaladevuni, San Diego, CA (US); June Namgoong, San Diego, CA (US); Jay Kumar Sundararajan, San Diego, CA (US); Taesang Yoo, San Diego, CA (US); Hwan Joon Kwon, San Diego, CA (US); Krishna Kiran Mukkavilli, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 785 days.

(21) Appl. No.: 18/004,255

(22) PCT Filed: Aug. 17, 2021

(86) PCT No.: PCT/US2021/046266
§ 371 (c)(1),
(2) Date: Jan. 4, 2023

(87) PCT Pub. No.: WO2022/040160
PCT Pub. Date: Feb. 24, 2022

(65) Prior Publication Data
US 2024/0013043 A1    Jan. 11, 2024

(30) Foreign Application Priority Data

Aug. 18, 2020    (GR) ............................... 20200100495

(51) Int. Cl.
*H04B 7/0456* (2017.01)
*G06N 3/08* (2023.01)

(52) U.S. Cl.
CPC ............. *G06N 3/08* (2013.01); *H04B 7/0479* (2023.05)

(58) Field of Classification Search
CPC ...... G06N 3/08; H04B 7/0479; H04B 7/0417; H04L 25/03165; H04L 27/38; H04L 25/0254
See application file for complete search history.

(56) References Cited

U.S. PATENT DOCUMENTS 10,862,553 B1 * 12/2020 Kim .................... H04L 27/2601
2019/0356516 A1 * 11/2019 Cao .................... H04L 25/0204
(Continued)

FOREIGN PATENT DOCUMENTS

CN 107181494 A 9/2017
CN 110309854 A 10/2019

OTHER PUBLICATIONS

International Search Report and Written Opinion—PCT/US2021/046266—ISA/EPO—Dec. 6, 2021.

*Primary Examiner* — Michael A Keller
(74) *Attorney, Agent, or Firm* — Holland & Hart LLP

(57) ABSTRACT

Methods, systems, and devices for wireless communications are described. A user equipment (UE) may train a first set of layers of a neural network based on channel estimates using a set of resources. The UE may generate a set of weights for the first set of layers of the neural network based on the training. The UE may receive, from a first network entity, an indication of an association between a first set of signaling and a second set of signaling based on the first set of layers of the neural network. The UE may receive the second set of signaling from a second network entity and process the second set of signaling using the set of weights for the first (Continued)

set of layers based on the association between the first set of signaling and the second set of signaling.

30 Claims, 23 Drawing Sheets

(56)                    References Cited

U.S. PATENT DOCUMENTS

| 2020/0218777 | A1  |  7/2020 | Xu et al. | |
| 2021/0021297 | A1* |  1/2021 | Smyth | H04B 1/7113 |
| 2021/0091881 | A1* |  3/2021 | Gutman | H04L 1/0025 |
| 2021/0399924 | A1* | 12/2021 | Amjad | H04L 25/03006 |
| 2022/0014398 | A1* |  1/2022 | Andrews | H04L 25/0254 |
| 2025/0259061 | A1* |  8/2025 | Katkoori | G06N 3/082 |

* cited by examiner

Input

505
Spatial Feature
Extraction

510
Tap Domain
Feature Extraction

515
Feature
Compression

520
Quantization

Encoder
Output

Reconstructed
Output

535
Spatial Feature
Reconstruction

530
Tap Domain
Feature
Reconstruction

525
Feature
Decompression

500

Figure 9:
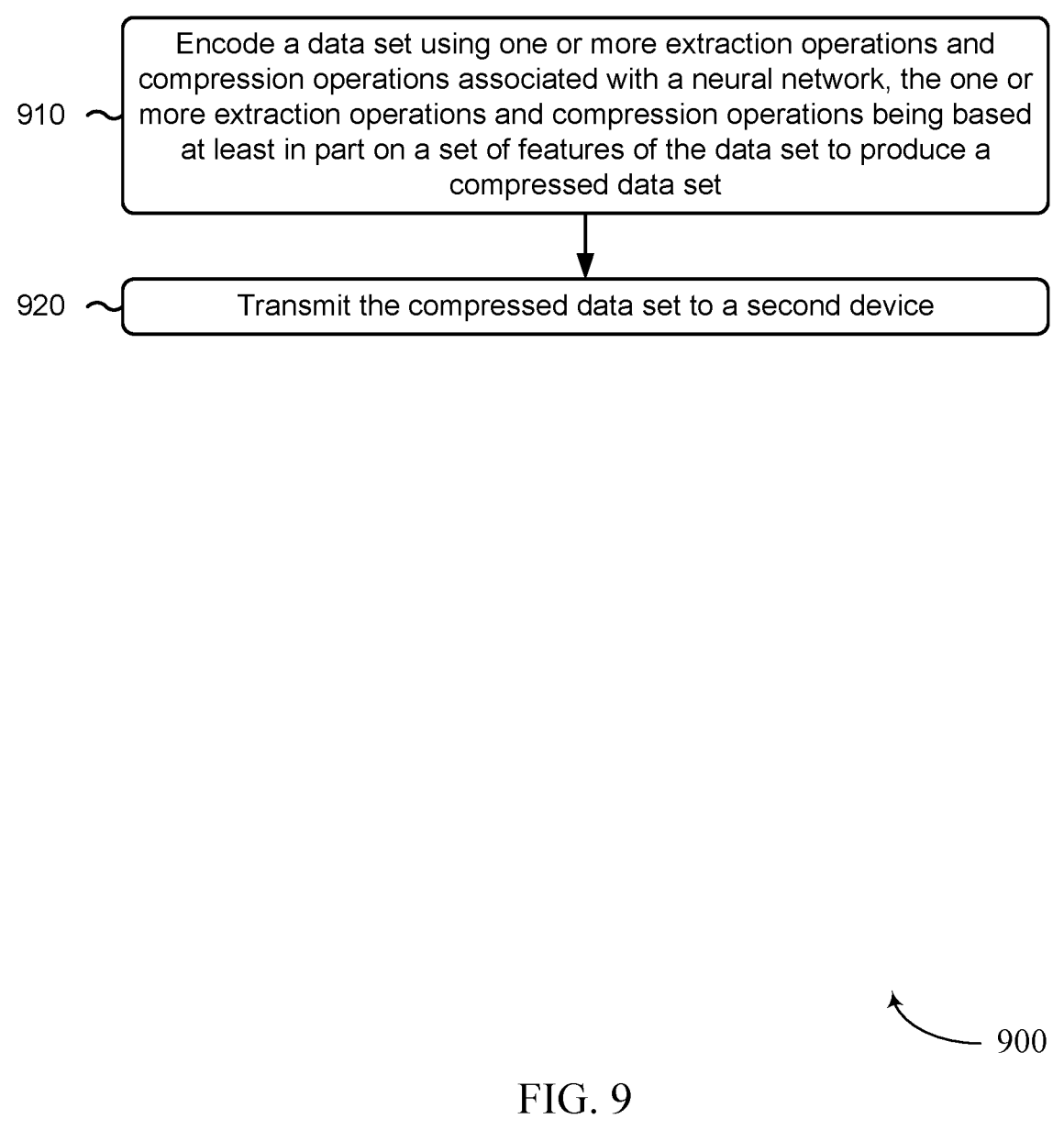

910 ～ Encode a data set using one or more extraction operations and compression operations associated with a neural network, the one or more extraction operations and compression operations being based at least in part on a set of features of the data set to produce a compressed data set 920 ～ Transmit the compressed data set to a second device

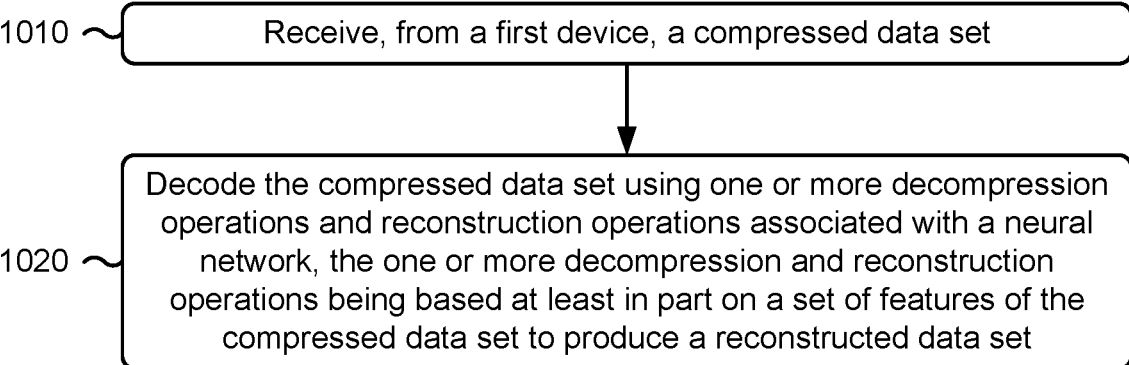

1010 — Receive, from a first device, a compressed data set

1020 — Decode the compressed data set using one or more decompression operations and reconstruction operations associated with a neural network, the one or more decompression and reconstruction operations being based at least in part on a set of features of the compressed data set to produce a reconstructed data set

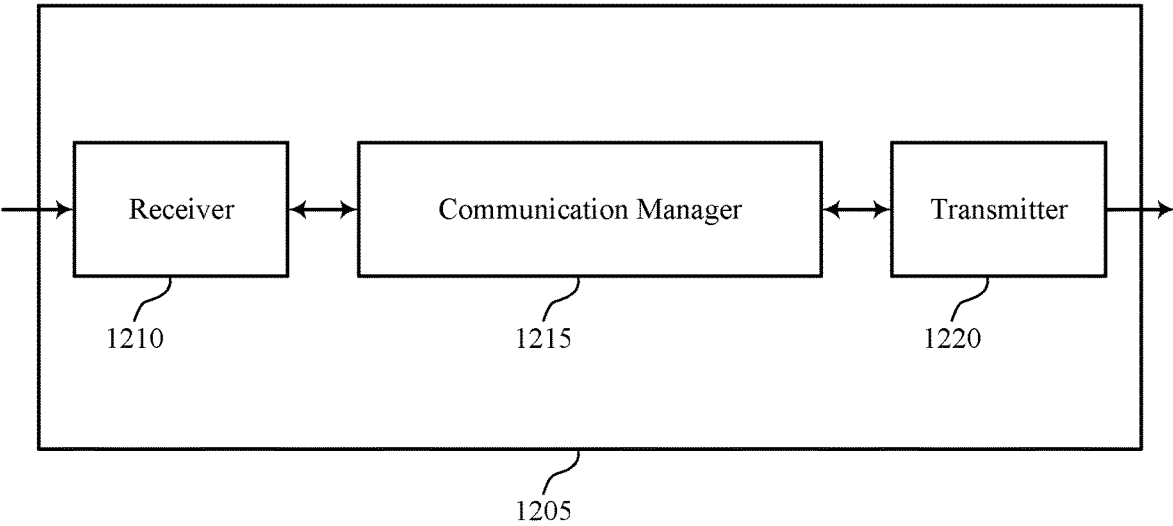
1210           1215           1220
1205
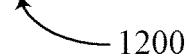
1200
FIG. 12

| Receiver | Communication Manager | Transmitter |

1610                    1615                    1620

1605

1600

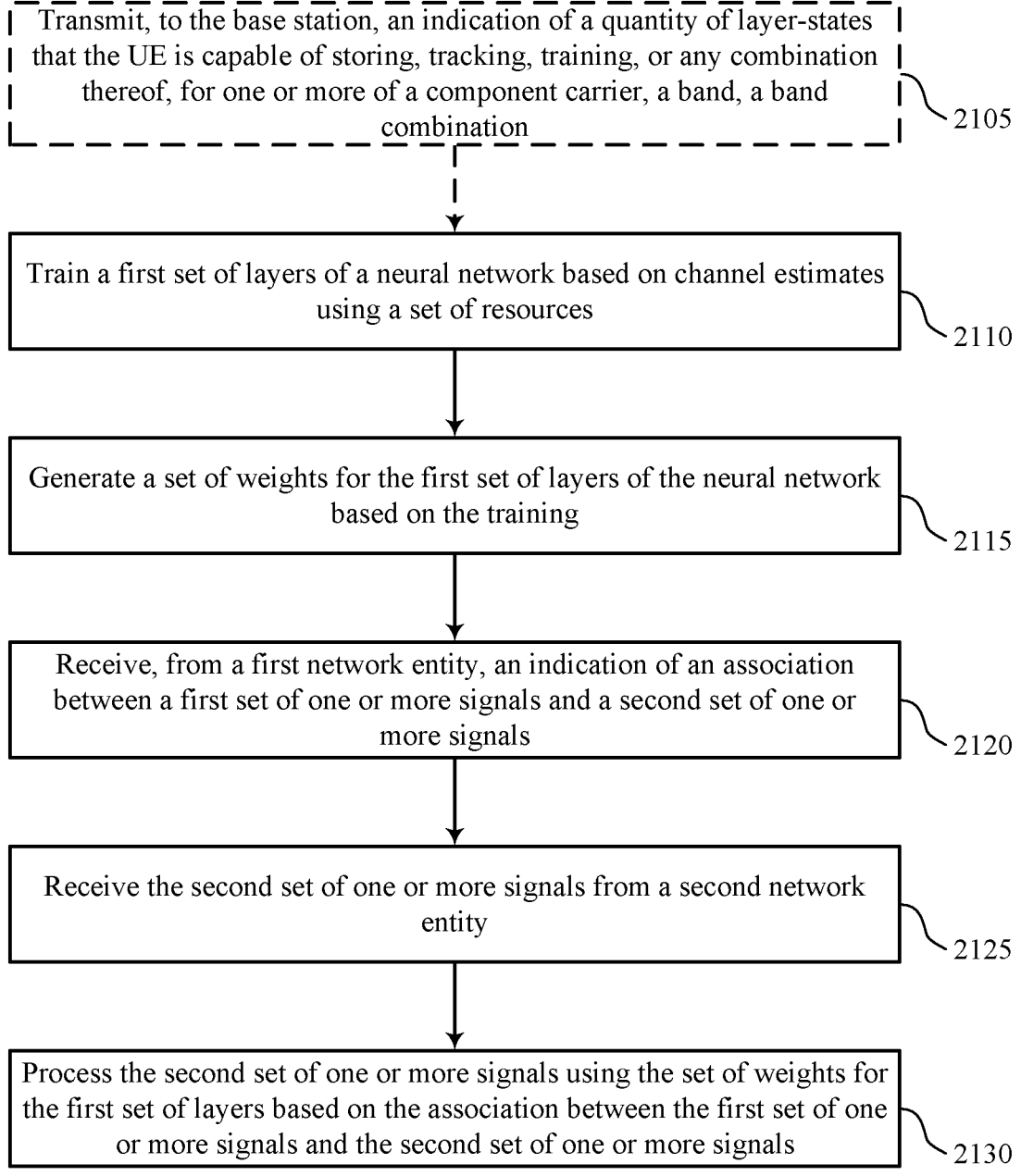

Transmit, to the base station, an indication of a quantity of layer-states that the UE is capable of storing, tracking, training, or any combination thereof, for one or more of a component carrier, a band, a band combination ⟋2105

Train a first set of layers of a neural network based on channel estimates using a set of resources ⟋2110

Generate a set of weights for the first set of layers of the neural network based on the training ⟋2115

Receive, from a first network entity, an indication of an association between a first set of one or more signals and a second set of one or more signals ⟋2120

Receive the second set of one or more signals from a second network entity ⟋2125

Process the second set of one or more signals using the set of weights for the first set of layers based on the association between the first set of one or more signals and the second set of one or more signals ⟋2130

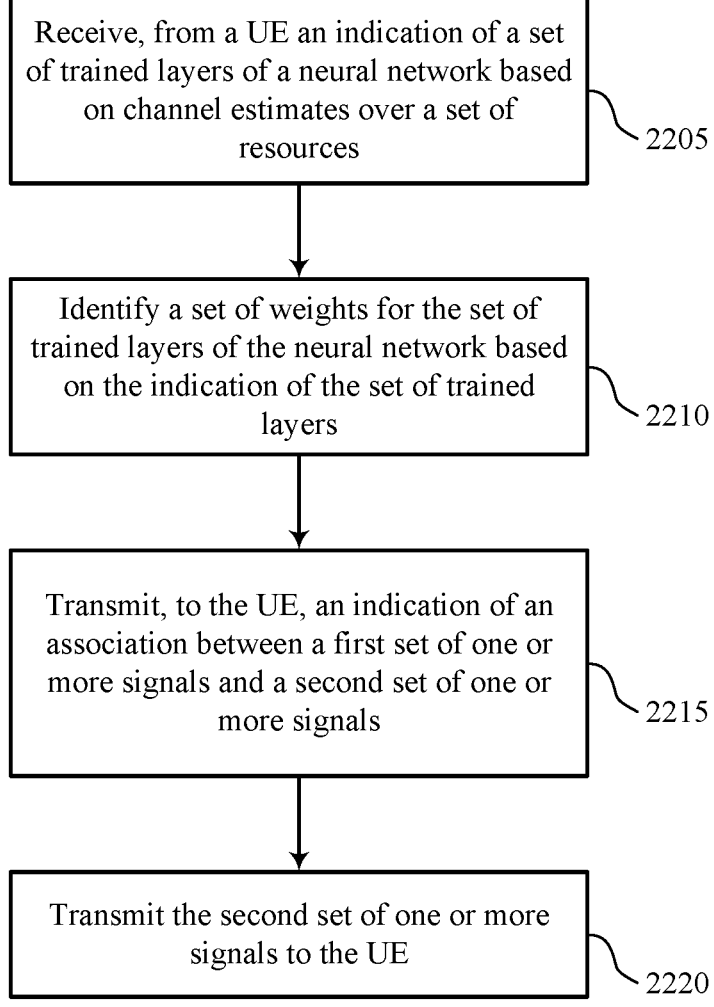

Receive, from a UE an indication of a set of trained layers of a neural network based on channel estimates over a set of resources

2205

Identify a set of weights for the set of trained layers of the neural network based on the indication of the set of trained layers

2210

Transmit, to the UE, an indication of an association between a first set of one or more signals and a second set of one or more signals

2215

Transmit the second set of one or more signals to the UE

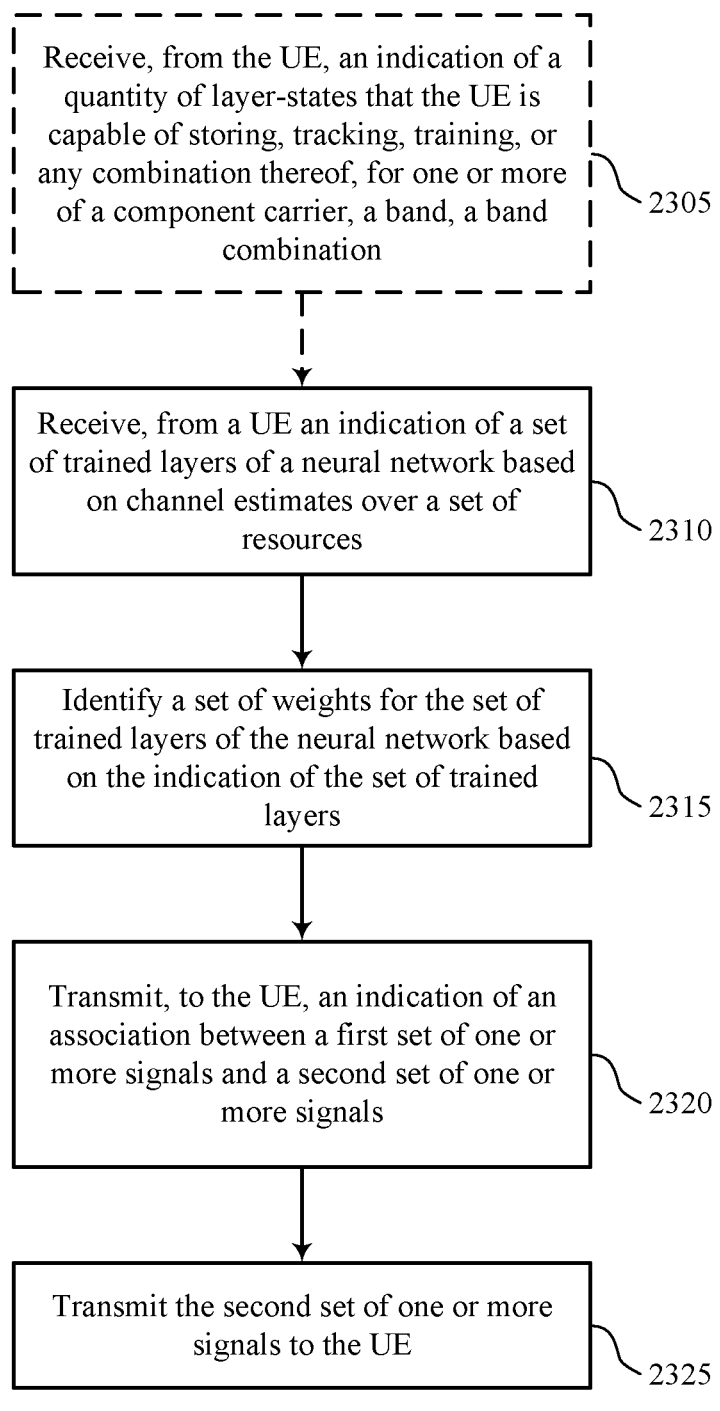

Receive, from the UE, an indication of a quantity of layer-states that the UE is capable of storing, tracking, training, or any combination thereof, for one or more of a component carrier, a band, a band combination

2305

Receive, from a UE an indication of a set of trained layers of a neural network based on channel estimates over a set of resources

2310

Identify a set of weights for the set of trained layers of the neural network based on the indication of the set of trained layers

2315

Transmit, to the UE, an indication of an association between a first set of one or more signals and a second set of one or more signals

2320

Transmit the second set of one or more signals to the UE

NEURAL NETWORK OR LAYER CONFIGURATION INDICATOR FOR A CHANNEL STATE INFORMATION SCHEME

CROSS REFERENCES

The present application is a 371 national stage filing of International PCT Application No. PCT/US2021/046266 by Manolakos et al. entitled "NEURAL NETWORK OR LAYER CONFIGURATION INDICATOR FOR A CHANNEL STATE INFORMATION SCHEME," filed Aug. 17, 2021; and claims priority to Greek Patent Application No. 20200100495 by Manolakos et al. entitled "NEURAL NETWORK OR LAYER CONFIGURATION INDICATOR FOR A CHANNEL STATE INFORMATION SCHEME," filed Aug. 18, 2020, each of which is assigned to the assignee hereof, and each of which is expressly incorporated by reference in its entirety herein.

INTRODUCTION

The following relates to wireless communications, and more specifically to reusing trained layers of a neural network for processing signals or channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include training a first set of layers of a neural network based on channel estimates using a set of resources, generating a set of weights for the first set of layers of the neural network based on the training, receiving, from a first network entity, an indication of an association between a first set of one or more signals and a second set of one or more signals based on the first set of layers of the neural network, receiving the second set of one or more signals from a second network entity, and processing the second set of one or more signals using the set of weights for the first set of layers based on the association between the first set of one or more signals and the second set of one or more signals.

An apparatus for wireless communications at a UE is described. The apparatus may include a processor, memory in electronic communication with the processor, and instructions stored in the memory. The instructions may be executable by the processor to cause the apparatus to train a first set of layers of a neural network based on channel estimates using a set of resources, generate a set of weights for the first set of layers of the neural network based on the training, receive, from a first network entity, an indication of an association between a first set of one or more signals and a second set of one or more signals based on the first set of layers of the neural network, receive the second set of one or more signals from a second network entity, and process the second set of one or more signals using the set of weights for the first set of layers based on the association between the first set of one or more signals and the second set of one or more signals.

Another apparatus for wireless communications at a UE is described. The apparatus may include means for training a first set of layers of a neural network based on channel estimates using a set of resources, means for generating a set of weights for the first set of layers of the neural network based on the training, means for receiving, from a first network entity, an indication of an association between a first set of one or more signals and a second set of one or more signals based on the first set of layers of the neural network, means for receiving the second set of one or more signals from a second network entity, and means for processing the second set of one or more signals using the set of weights for the first set of layers based on the association between the first set of one or more signals and the second set of one or more signals.

A non-transitory computer-readable medium storing code for wireless communications at a UE is described. The code may include instructions executable by a processor to train a first set of layers of a neural network based on channel estimates using a set of resources, generate a set of weights for the first set of layers of the neural network based on the training, receive, from a first network entity, an indication of an association between a first set of one or more signals and a second set of one or more signals based on the first set of layers of the neural network, receive the second set of one or more signals from a second network entity, and process the second set of one or more signals using the set of weights for the first set of layers based on the association between the first set of one or more signals and the second set of one or more signals.

Some examples of the method, apparatuses, and non-transitory computer-readable medium described herein may further include operations, features, means, or instructions for transmitting, to the first network entity, an indication of a quantity of layer-states that the UE may be capable of storing, tracking, training, processing, or any combination thereof, for one or more of a component carrier, a band, a band combination.

In some examples of the method, apparatuses, and non-transitory computer-readable medium described herein, processing the second set of one or more signals may include operations, features, means, or instructions for decoding the second set of one or more signals using the set of weights for the first set of layers based on the association between the first set of one or more signals and the second set of one or more signals.

In some examples of the method, apparatuses, and non-transitory computer-readable medium described herein, processing the second set of one or more signals may include operations, features, means, or instructions for demodulating the second set of one or more signals using the set of weights for the first set of layers based on the association between the first set of one or more signals and the second set of one or more signals.

In some examples of the method, apparatuses, and non-transitory computer-readable medium described herein, processing the second set of one or more signals may include operations, features, means, or instructions for estimating the downlink channel from the second set of one or more signals using the set of weights for the first set of layers based on the association between the first set of one or more signals and the second set of one or more signals.

In some examples of the method, apparatuses, and non-transitory computer-readable medium described herein, processing the second set of one or more signals may include operations, features, means, or instructions for compressing the second set of one or more signals using the set of weights for the first set of layers based on the association between the first set of one or more signals and the second set of one or more signals, and training the first set of layers of the neural network, a second set of layers of the neural network, or both, based on compressing the second set of one or more signals.

In some examples of the method, apparatuses, and non-transitory computer-readable medium described herein, processing the second set of one or more signals may include operations, features, means, or instructions for training a set of layers of a second neural network using the set of weights for the first set of layers of the neural network based on the association between the first set of one or more signals and the second set of one or more signals.

In some examples of the method, apparatuses, and non-transitory computer-readable medium described herein, the first set of one or more signals includes one or more of a channel state information (CSI) reference signal (CSI-RS), a synchronization signal block (SSB), a positioning reference signal (PRS), a demodulation reference signal (DMRS), a tracking signal, a data channel, or a control channel.

In some examples of the method, apparatuses, and non-transitory computer-readable medium described herein, the second set of one or more signals includes one or more of a CSI-RS, an SSB, a PRS, a DMRS, a tracking signal, a data channel, or a control channel.

In some examples of the method, apparatuses, and non-transitory computer-readable medium described herein, the indication of the association includes a source identifier and a target identifier.

In some examples of the method, apparatuses, and non-transitory computer-readable medium described herein, the source identifier includes an identifier of the neural network.

In some examples of the method, apparatuses, and non-transitory computer-readable medium described herein, the target identifier includes an identifier of the second set of one or more signals, a procedure for the second set of one or more signals, or an identifier of a second neural network, or any combination.

In some examples of the method, apparatuses, and non-transitory computer-readable medium described herein, the source identifier includes an identifier of a signal or procedure corresponding to at least the first set of one or more signals.

In some examples of the method, apparatuses, and non-transitory computer-readable medium described herein, the source identifier includes an identifier of at least the first set of layers of the neural network.

In some examples of the method, apparatuses, and non-transitory computer-readable medium described herein, the indication of the association may be received via higher-layer signals, a medium access control (MAC) control element (CE), downlink control information, or both.

In some examples of the method, apparatuses, and non-transitory computer-readable medium described herein, the first set of one or more signals corresponds to a first component carrier and the second set of one or more signals corresponds to a second component carrier.

In some examples of the method, apparatuses, and non-transitory computer-readable medium described herein, the first set of one or more signals corresponds to a first band and the second set of one or more signals corresponds to a second band.

In some examples of the method, apparatuses, and non-transitory computer-readable medium described herein, the first set of one or more signals corresponds to a first band combination and the second set of one or more signals corresponds to a second band combination.

In some examples of the method, apparatuses, and non-transitory computer-readable medium described herein, the first set of one or more signals corresponds to a first frequency range and the second set of one or more signals corresponds to a second frequency range.

In some examples of the method, apparatuses, and non-transitory computer-readable medium described herein, the first set of layers of the neural network includes one or more residual neural network layers or one or more convolutional neural network layers, or any combination thereof.

Some examples of the method, apparatuses, and non-transitory computer-readable medium described herein may further include operations, features, means, or instructions for receiving a third set of one or more signals from the second network entity, and processing the third set of one or more signals using the set of weights.

In some examples of the method, apparatuses, and non-transitory computer-readable medium described herein, the second network entity may be another UE, a base station, a transmission and reception point, a server, the first network entity or any combination thereof.

A method for wireless communications at a network entity including is described. The method may include receiving, from a UE an indication of a set of trained layers of a neural network based on channel estimates over a set of resources, identifying a set of weights for the set of trained layers of the neural network based on the indication of the set of trained layers, transmitting, to the UE, an indication of an association between a first set of one or more signals and a second set of one or more signals based on the set of trained layers of the neural network, and transmitting the second set of one or more signals to the UE.

An apparatus for wireless communications at a network entity including is described. The apparatus may include a processor, memory in electronic communication with the processor, and instructions stored in the memory. The instructions may be executable by the processor to cause the apparatus to receive, from a UE an indication of a set of trained layers of a neural network based on channel estimates over a set of resources, identify a set of weights for the set of trained layers of the neural network based on the indication of the set of trained layers, transmit, to the UE, an indication of an association between a first set of one or more signals and a second set of one or more signals based on the set of trained layers of the neural network, and transmit the second set of one or more signals to the UE.

Another apparatus for wireless communications at a network entity including is described. The apparatus may include means for receiving, from a UE an indication of a set of trained layers of a neural network based on channel estimates over a set of resources, means for identifying a set of weights for the set of trained layers of the neural network based on the indication of the set of trained layers, means for transmitting, to the UE, an indication of an association between a first set of one or more signals and a second set of one or more signals based on the set of trained layers of the neural network, and means for transmitting the second set of one or more signals to the UE.

A non-transitory computer-readable medium storing code for wireless communications at a network entity including is described. The code may include instructions executable by a processor to receive, from a UE an indication of a set of trained layers of a neural network based on channel estimates over a set of resources, identify a set of weights for the set of trained layers of the neural network based on the indication of the set of trained layers, transmit, to the UE, an indication of an association between a first set of one or more signals and a second set of one or more signals based on the set of trained layers of the neural network, and transmit the second set of one or more signals to the UE.

Some examples of the method, apparatuses, and non-transitory computer-readable medium described herein may further include operations, features, means, or instructions for receiving, from the UE, an indication of a quantity of layer-states that the UE may be capable of storing, tracking, training, processing, or any combination thereof, for one or more of a component carrier, a band, a band combination.

In some examples of the method, apparatuses, and non-transitory computer-readable medium described herein, the first set of one or more signals includes one or more of a CSI-RS, an SSB, or a PRS.

In some examples of the method, apparatuses, and non-transitory computer-readable medium described herein, the second set of one or more signals includes one or more of a CSI-RS, an SSB, or a PRS.

In some examples of the method, apparatuses, and non-transitory computer-readable medium described herein, the indication of the association includes a source identifier and a target identifier.

In some examples of the method, apparatuses, and non-transitory computer-readable medium described herein, the source identifier includes an identifier of the neural network.

In some examples of the method, apparatuses, and non-transitory computer-readable medium described herein, the source identifier includes an identifier of at least the set of trained layers of the neural network.

In some examples of the method, apparatuses, and non-transitory computer-readable medium described herein, the source identifier includes an identifier of a signal or procedure corresponding to at least the first set of one or more signals.

In some examples of the method, apparatuses, and non-transitory computer-readable medium described herein, the target identifier includes an identifier of the second set of one or more signals, a procedure for the second set of one or more signals, or both.

In some examples of the method, apparatuses, and non-transitory computer-readable medium described herein, transmitting the indication of the association may include operations, features, means, or instructions for transmitting the indication of the association via a MAC CE, downlink control information, or both.

In some examples of the method, apparatuses, and non-transitory computer-readable medium described herein, the first set of one or more signals corresponds to a first component carrier and the second set of one or more signals corresponds to a second component carrier.

In some examples of the method, apparatuses, and non-transitory computer-readable medium described herein, the first set of one or more signals corresponds to a first band and the second set of one or more signals corresponds to a second band.

In some examples of the method, apparatuses, and non-transitory computer-readable medium described herein, the first set of one or more signals corresponds to a first frequency range and the second set of one or more signals corresponds to a second frequency range.

In some examples of the method, apparatuses, and non-transitory computer-readable medium described herein, the set of trained layers of the neural network includes one or more residual neural network layers or one or more convolutional neural network layers, or any combination thereof.

BRIEF DESCRIPTION OF THE DRAWINGS

FIG. 9 illustrates an example process that supports neural network or layer configuration indicator for a CSI scheme in accordance with aspects of the present disclosure.

FIG. 10 illustrates an example process that supports neural network or layer configuration indicator for a CSI scheme in accordance with aspects of the present disclosure.

FIGS. 12 and 13 show block diagrams of devices that support neural network or layer configuration indicator for a CSI scheme in accordance with aspects of the present disclosure.

FIGS. 20 through 23 show flowcharts illustrating methods that support neural network or layer configuration indicator for a CSI scheme in accordance with aspects of the present disclosure.

DETAILED DESCRIPTION

Figure 1:
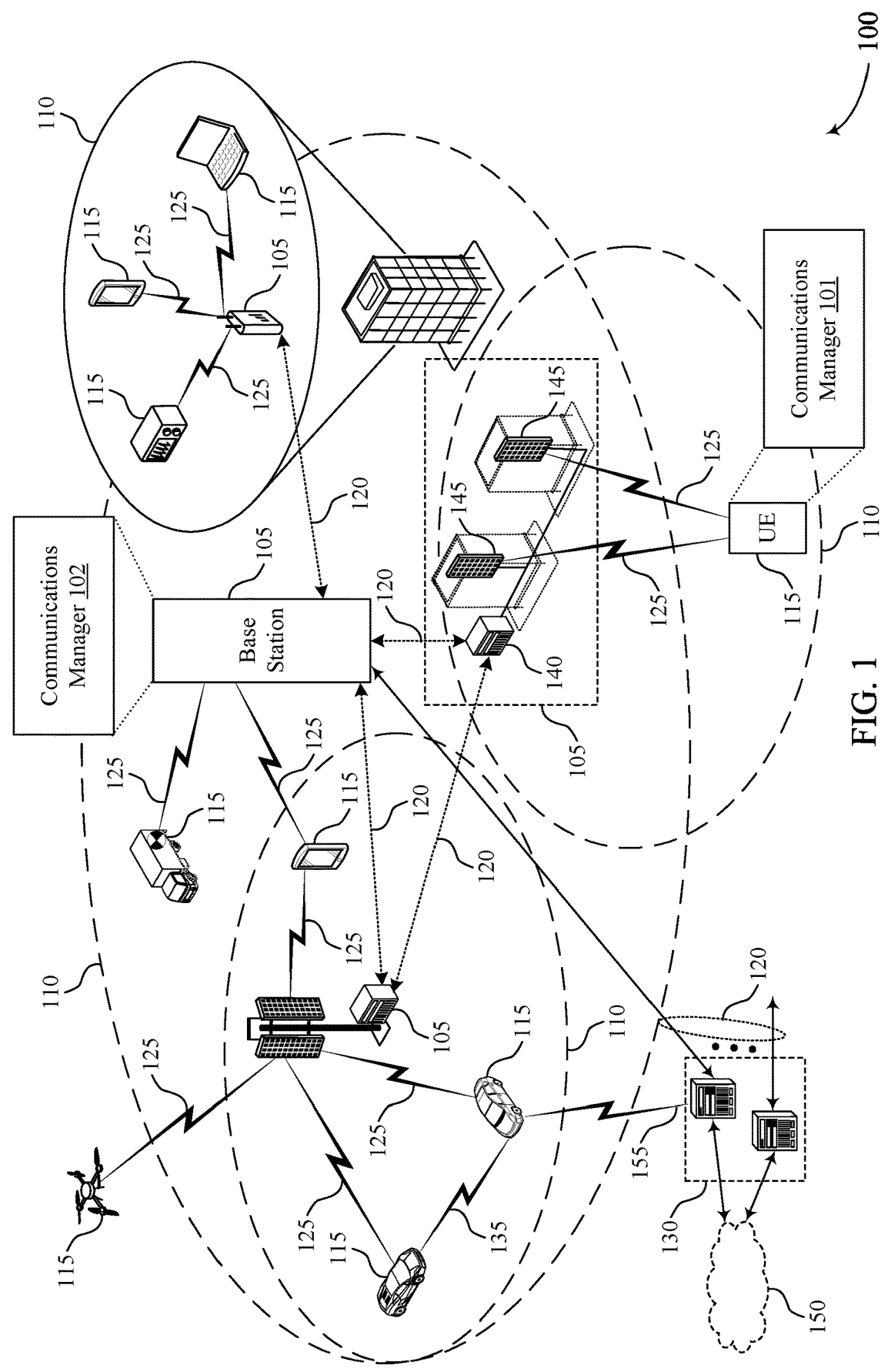
FIG. 1 illustrates an example of a system for wireless communications that supports neural network or layer configuration indicator for a channel state information (CSI) scheme in accordance with aspects of the present disclosure.

A user equipment (UE) may measure signals or signaling from a base station and transmit a report of the measurements to the base station. For example, the UE may measure reference signals and transmit measurement reports of the reference signals to assist the base station in managing the network and improving channel conditions for served devices. In some cases, the UE may transmit channel state information (CSI) or channel state feedback (CSF), generated based on measuring the signaling from the base station. Some wireless communications systems support multiple types of CSI. For example, a first type of CSI may be used for a beam selection scheme, where the UE selects indices for the best possible beams and sends CSI information to report the indices. A second type of CSI may be a beam-combination scheme, where the UE also computes the best linear combination coefficients of various beams and reports the beam indices, where the coefficients are used for combining them on a sub-band basis. A wireless communications system may support at least a neural network-based CSI, or a machine learning-based CSI, which may use machine learning techniques to compress and feedback the channel and interferences observed at the UE. For neural network-based CSI reporting, a UE may train one or more layers of a neural network, or the full neural network, using a set of resources. The UE generates weights, or coefficients, at each layer, and indicates the set of weights to the base station. The base station can recreate the channel based on the set of weights and perform efficient channel maintenance. A layer-state may correspond to a collection of weights the layer contains, obtained via the training.

A wireless communications system described herein may support reusing a trained neural network or neural network layer to process other signals or channels. For example, a UE may train a neural network or a layer of a neural network, and the UE may be indicated an association between two types of signals or processes. The UE may receive a neural network or layer configuration indicator (NNCI) for the neural network-based CSI reporting, indicating the association. A UE may have trained one or more layers of the neural network using a first set of one or more signals, and these trained layers may be used to efficiently process a second set of one or more signals at the UE. If the UE is aware of an association between a trained layer and a signal or channel that can be processed by reusing the trained layer, the UE may avoid cold-start training of a neural network or layer and save processing power and latency.

The UE may indicate a number of states that the UE can store, track, or train, per component carrier, band, or sub-band. For example, a UE may train a neural network on one CSI-RS from one gNB and use the training for demodulation of another reference signal or channel. Some example associations of using a previously trained neural network state or layer-state may include using CSI-RS training for a demodulation reference signal (DMRS), other CSI-RS, or a positioning reference signal (PRS), using synchronization signal block (SSB) training for CSI-RS or a PRS, or using PRS for DMRS. An NNCI may include a source identifier of a signal or procedure used to train the neural network, a source identifier of a neural network which has been trained, or a source identifier of a specific layer. The NNCI may be configured semi-statically or dynamically. In some cases, the NNCI may be used for cross-component carrier NNCI relations, cross-frequency range relations, cross-band relations, or cross-band combination relations.

Aspects of the disclosure are initially described in the context of wireless communications systems. Aspects of the disclosure are further illustrated by and described with reference to apparatus diagrams, system diagrams, and flowcharts that relate to neural network or layer configuration indicator for a CSI scheme.

FIG. 1 illustrates an example of a wireless communications system 100 that supports neural network or layer configuration indicator for a CSI scheme in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may support at least a neural network-based CSI, which may use machine learning techniques to compress and feedback the channel and interferences observed at the UE 115. For the neural network-based CSI reporting, a UE 115 may train one or more layers of a neural network, or the full neural network, using a set of resources. The UE 115 generates weights, or coefficients, at each layer, and indicates the set of weights to the base station. The base station can recreate the channel based on the set of weights and perform efficient channel maintenance. A layer-state may correspond to a collection of weights the layer contains, obtained via the training.

A wireless communications system described herein, such as the wireless communications system 100 and 200, may support reusing a trained neural network or neural network layer to process other signals or channels. For example, a UE 115 may train a neural network or a layer of a neural network, and the UE 115 may be indicated an association between two types of signals or processes. The UE 115 may receive an NNCI for neural network-based CSI reporting indicating the association. The UE 115 may have trained one or more layers of the neural network using a first set of one or more signals, and these trained layers may be used to efficiently process a second set of one or more signals at the UE 115. The base station 105 may indicate that the UE 115 can reuse one or more trained layers or neural networks to process another signal or channel. For example, the base station 105 may transmit the NNCI to indicate one or more associations between the first set of one or more signals and the second set of one or more signals. If the UE 115 is aware of an association between a trained layer and a signal or channel that can be decoded/demodulation/estimated using a trained layer, the UE 115 may avoid cold-start training or a neural network or layer and save processing power and latency by reusing a previously trained layer or neural network.

The UE 115 may indicate a number of states that the UE 115 can store, track, or train, per component carrier, band, or sub-band. For example, a UE 115 may train a neural network on one CSI-RS from one base station 105 and use the training for demodulation of another reference signal or channel. Some example associations of using a previously trained neural network state or layer-state may include using CSI-RS training for a DMRS, other CSI-RS, or a PRS, using SSB training for CSI-RS or a PRS, or using PRS for DMRS. An NNCI may include a source identifier of a signal or procedure used to train the neural network, a source identifier of a neural network which has been trained, or a source identifier of a specific layer. The NNCI may be configured semi-statically or dynamically. In some cases, the NNCI may be used for cross-component carrier NNCI relations, cross-frequency range relations, cross-band relations, or cross-band combination relations.

In various examples, a communication manager 101 may be included in a UE 115 to support a neural network or layer configuration indicator for a CSI scheme. A communication manager 102 may be included in a network entity, such as a base station 105, a UE 115, a server, a transmission and reception point.

In some examples, a communication manager 101 may train a first set of layers of a neural network based at least in part on channel estimates using a set of resources. The communication manager 101 may generate a set of weights for the first set of layers of the neural network based at least in part on the training. The communication manager 101 may receive, from a first network entity, an indication of an association between a first set of one or more signals and a second set of one or more signals based at least in part on the first set of layers of the neural network. The communication manager 101 may receive the second set of one or more signals from a second network entity, and the communication manager 101 may process the second set of one or more signals using the set of weights for the first set of layers based at least in part on the association between the first set of one or more signals and the second set of one or more signals. In some cases, the communication manager 101 may process the second set of one or more signals using a subset of weights, a subset of the first set of layers, or both based at least in part on the association between the first set of one or more signals and the second set of one or more signals.

In some examples, a communication manager 102 may receive, from a UE 115 an indication of a set of trained layers of a neural network based at least in part on channel estimates over a set of resources. The communication manager 102 may identify a set of weights for the set of trained layers of the neural network based at least in part on the indication of the set of trained layers. The communication manager 102 may transmit, to the UE, an indication of an association between a first set of one or more signals and a second set of one or more signals based at least in part on the set of trained layers of the neural network and transmit the second set of one or more signals to the UE.

Figure 2:
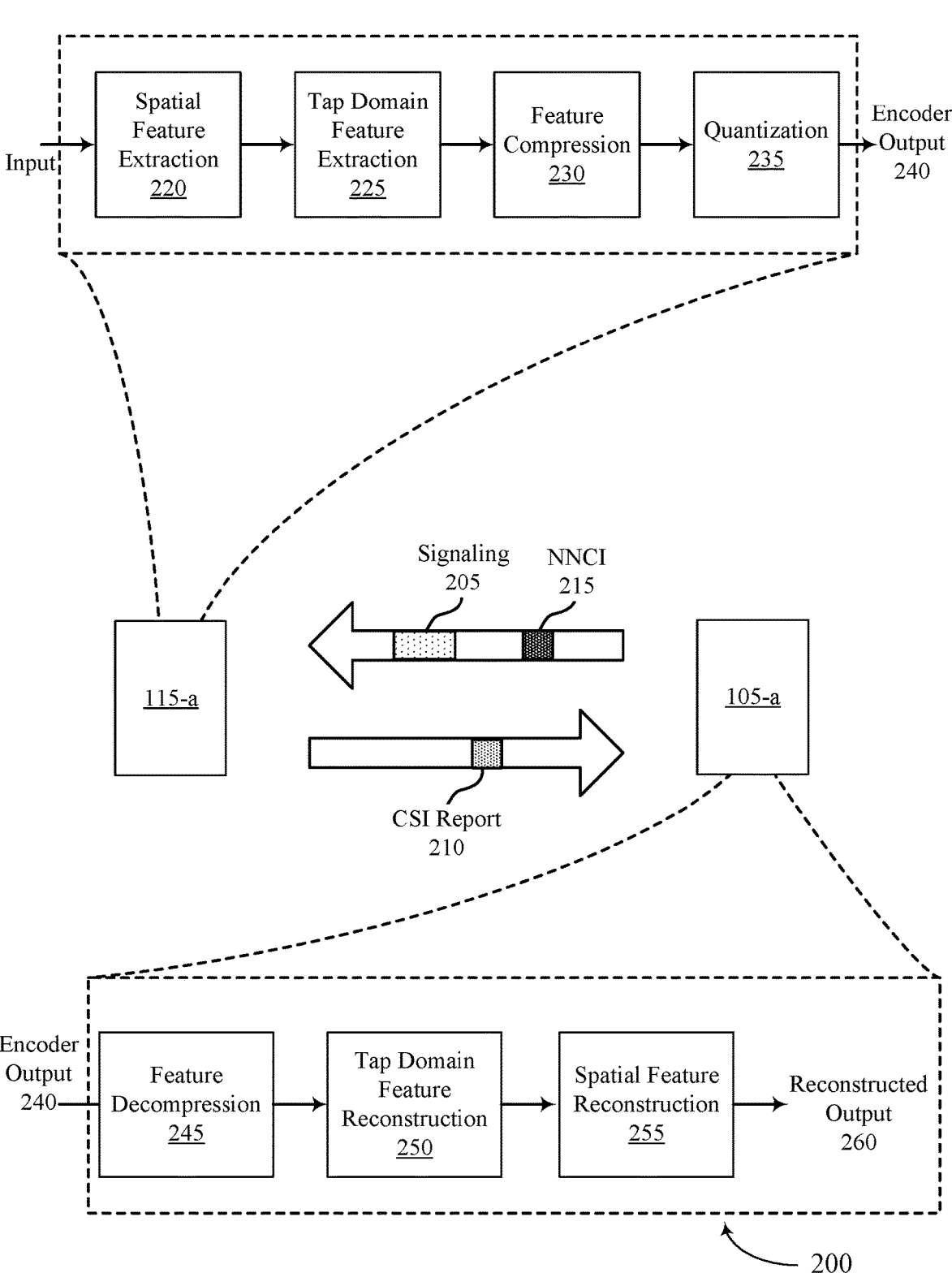
FIG. 2 illustrates an example of a wireless communications system that supports neural network or layer configuration indicator for a CSI scheme in accordance with aspects of the present disclosure.

FIG. 2 illustrates an example of a wireless communications system 200 that supports a neural network or layer configuration indicator for a CSI scheme in accordance with aspects of the present disclosure. In some examples, the wireless communications system 200 may implement aspects of wireless communication system 100. The wireless communications system 200 may include UE 115-*a* and base station 105-*a*, which may be respective examples of a UE 115 and a base station 105 described with reference to FIG. 1. In some examples, UE 115-*a* may be an example of an encoding device, and base station 105-*a* may be an example of a decoding device. In some other examples, another UE 115 may be an example of a decoding device.

UE 115-*a* may measure reference signals, channels, or both, to report to a network entity. For example, UE 115-*a* may measure signaling 205 to determine CSI or CSF, and UE 115-*a* may transmit a CSI report to base station 105-*a* to indicate the measured channel conditions. In some cases, the signaling 205 may include reference signals, such as a CSI-RS, which UE 115-*a* may measure to determine the CSI. In some cases, UE 115-*a* may measure received power of reference signals from a serving cell and/or neighbor cells, signal strength of inter-radio access technology (e.g., Wi-Fi) networks, or sensor signals for detecting locations of one or more objects within an environment, among other types of signaling. A CSI report may include channel quality information (CQI), a pre-coding matrix indicator (PMI), a rank indicator, a CSI-RS resource indicator (CRI), an SSB resource indicator (SSBRI), a layer indicator, or any combination thereof.

Some wireless communications systems support multiple types of CSI. A first type of CSI (e.g., Type 1 CSI) may be used for a beam selection scheme, where a UE 115 selects the best possible beam indices and reports CSI information based on the best beam indices. A second type of CSI (e.g., Type 2 CSI) may be used for a beam-combination scheme, where a UE 115 also computes the best linear combination coefficients of various beams and reports the beam indices. In some cases of Type 2 CSI, the UE 115 may report coefficients for combining the beams. In some cases, Type 2 CSI reporting may occur on a sub-band, or configured sub-band, basis.

The wireless communications system 200 may support at least a neural network-based CSI reporting scheme. Neural network-based CSI may use machine learning techniques to compress and feedback a channel, including interference observed at a UE 115. For example, UE 115-*a* may determine a set of weights, or coefficients, which represent a compressed form of a received channel (e.g., a downlink channel, a sidelink channel, etc.). UE 115-*a* may report the set of weights in a CSI report to base station 105-*a*, and base station 105-*a* may be able to reconstruct the channel according to the set of weights. By compressing the channel for a neural network-based CSI report 210, the CSI report 210 may be comprehensive, informing base station 105-*a* of both the channel and any interference. In some cases, the neural network-based CSI report may compress an entire channel, or the neural network-based CSI report may have a variable granularity or accuracy for individual sub-bands.

In some aspects described herein, an encoding device, such as UE 115-*a*, may train one or more neural networks, or one or more layers of a neural network, to support a neural network-based CSI report 210. In some cases, the one or more layers, or one or more neural networks, may be trained to learn dependence of measured qualities on individual parameters, isolate the measured qualities through various layers of the one or more neural networks (also referred to as "operations"), and compress measurements in a way that limits compression loss. In some aspects, UE 115-*a* may use a nature of a quantity of bits being compressed to construct a step-by-step extraction and compression of each feature (also referred to as a dimension) that affects the quantity of bits. In some aspects, the quantity of bits may be associated with sampling of one or more reference signals and/or may indicate CSI. For example, UE 115-*a* may encode measurements, producing compressed measurements, using one or more extraction operations and compression operations associated with a neural network with the one or more extraction operations and compression operations being based at least in part on a set of features of the measurements.

As an example, UE 115-*a*, may be configured to perform one or more operations on samples (e.g., data) received via one or more antennas of the encoding device to compress the samples. In some cases, the term "layer" may be used to denote an operation performed on input data. For example, there may be fully connected layers, convolutional layers, etc. For example, for a layer A×B(p), A may refer to a number of input features, B may refer to a number of output features, and p may refer to a kernel size, where the kernel size refers to a number of adjacent coefficients that are combined in a dimension. For one-dimensional convolutions, p may be a single value, where p may include multiple values (e.g., as a tuple) for higher dimensions.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions. In some aspects, the reference numbers identify operations that include multiple neural network layers and/or operations. Neural networks of the encoding device and the decoding device may be formed by concatenation of one or more of the referenced operations.

In an example, base station 105-*a* may transmit signaling 205 to UE 115-*a*. The signaling 205 may include a reference signal, such as a CSI-RS. The signaling 205 may be an input to one or more neural networks, each of which with one or more layers. For example, 115-*a* may perform a spatial feature extraction 220 on the input. In some cases, UE 115-*a* may perform a tap domain feature extraction 225 on the data. In some examples, UE 115-*a* may perform the tap domain feature extraction before performing the spatial feature extraction. In some cases, some features may be extracted simultaneously, or multiple layer operations may be performed simultaneously. In some aspects, an extraction operation may include multiple operations or layers. For example, the multiple operations may include one or more convolution operations, one or more fully connected operations, and/or the like, that may be activated or inactive. In some aspects, an extraction operation may include a residual neural network (ResNet) operation.

UE 115-*a* may perform feature compression 230 on one or more features extracted from the input. In some aspects, a compression operation may include one or more operations, such as one or more convolution operations, one or more fully connected operations, and/or the like. The feature compression 230 may further compress two-dimensional spatial-temporal features into a lower dimension vector (e.g., of size M) for transmission over-the-air. After compression, a bit count of an output may be less than a bit count of an input.

UE 115-*a* may perform a quantization operation 235 before transmitting an encoder output 240 over-the-air to base station 105-*a*. In some aspects, the encoding device may perform the quantization operation after flattening the output of the compression operation and/or performing a feature compression operation after flattening the output.

UE 115-*a* may transmit the compressed measurements to a network entity, such as server, a TRP, another UE, a base station, and/or the like. Although examples described herein refer to a base station 105 as the decoding device, the decoding device may be any network entity. The network entity may be referred to as a "decoding device."

Base station 105-*a* may receive the CSI feedback and attempt to reconstruct the channel. For example, base station 105-*a* may decode the compressed measurements using one or more decompression operations and reconstruction operations associated with a neural network. The one or more decompression and reconstruction operations may be based at least in part on a set of features of the compressed data set to produce reconstructed measurements. The decoding device may use the reconstructed measurements as CSI feedback.

For example, base station 105-*a* may receive the encoder output 240 and perform a feature decompression 245 on the encoder output 240. Base station 105-*a* may then perform a tap domain feature reconstruction 250. Base station 105-*a* may perform a spatial feature reconstruction 255 and attempt to reconstruct the channel as received by UE 115-*a*. In some aspects, the decoding device may perform spatial feature reconstruction before performing tap domain feature reconstruction. Additionally, or alternatively, some features may be extracted, reconstructed, or decompressed simultaneously. After the reconstruction operations, the decoding device may obtain a reconstructed output 260 of the input to the encoding device.

In some cases, the decoder (e.g., base station 105-*a*) may follow a reverse order of the encoder (e.g., UE 115-*a*). For example, if the encoding device follows operations (a, b, c, d), the decoding device may follow inverse operations (D, C, B, A). In some aspects, the decoding device may perform operations that are fully symmetric to operations of the encoding device. This may reduce a number of bits needed for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSI with a reduced payload. This may conserve network resources that may otherwise have been used to transmit a full data set as sampled by the encoding device.

The wireless communications system 200 may support reusing a trained layer, or a trained neural network, for efficient communications at a device. For example, UE 115-*a* may train a layer of a neural network, or a whole neural network, using a set of resources. Each trained layer-state may correspond to a collection of weights the layer contains. UE 115-*a* may be signaled that UE 115-*a* can reuse one or more trained layers of a neural network to process another signal or channel. For example, UE 115-*a* may train one layer of a neural network using a CSI-RS, and UE 115-*a* may be capable of processing other types of signals or signaling, such as decoding PRS or SSBs, using the trained layer. UE 115-*a* may decode, demodulate, estimate, or compress, or any combination thereof, another signal or channel based on reusing a previously trained layer or neural network. In some cases, UE 115-*a* may process the other types of signals using a subset of the weights or layers of the neural network. For example, UE 115-*a* may reuse one or more layers of the neural network (e.g., up to all of the trained layers), or UE 115-*a* may reuse some of the determined weights for the layers (e.g., up to all of the determined weights) to process the other type of signals.

UE 115-*a* may be indicated associations between reference signals or channels which UE 115-*a* may utilize for enhanced processing. The indication of the association between a first set of one or more signals and a second set of one or more signals may be referred to as an NNCI 215. For example, if UE 115-*a* is aware of an association, UE 115-*a* may avoid performing a cold-start of a neural network or layer which may be used for other purposes. For example, instead of training a new neural network or layer of a neural network for a PRS, UE 115-*a* may at least partially use a neural network, or a layer of a neural network, which was trained using CSI-RS. Some weights for the neural network trained by CSI-RS may be applicable for a neural network, or at least a layer of the neural network, for PRS. Additionally, or alternatively, UE 115-*a* may determine weights for at least a layer of a neural network for PRS based on weights of a neural network for CSI-RS. UE 115-*a* may save processing power and latency by reusing a previously trained layer or neural network.

UE 115-*a* may report a number of layer-states that can be saved, stored, or tracked at UE 115-*a*. UE 115-*a* may report the number per component carrier, per band, per sub-band, or per band combination. For example, UE 115-*a* may have one or more associations stored, such that UE 115-*a* may reuse multiple different layers or neural networks for processing other signals or channels.

The NNCI 215 may include a source identifier and a target identifier for the association. In some cases, the source identifier may refer to the first set of signals, and the target identifier may refer to the second set of signals. The source identifier may, in some cases, include a source identifier of a specific signal or procedure (e.g., a CSI process or report ID) that has been used to train a neural network. Additionally, or alternatively, the source identifier may include an identifier of a neural network which has been trained. In some cases, the source identifier may include an identifier of a specific layer of a neural network. The target identifier may refer to a signal or procedure that may be operated on or performed by using a previously trained neural network or layer.

UE 115-*a* may be configured with multiple different types of associations for reusing a neural network or a layer of a neural network. For example, UE 115-*a* may train a neural network, or a layer of a neural network, using a CSI-RS. UE 115-*a* may then reuse the neural network, or the layer of the neural network, for processing a DMRS, another CSI-RS, or a PRS. Additionally, or alternatively, UE 115-*a* may train a neural network, or a layer of a neural network, using an SSB, and UE 115-*a* may reuse the trained layer or trained neural network for CSI-RS or PRS. Additionally, or alternatively, UE 115-*a* may train a neural network, or a layer of a neural network, using a PRS, and UE 115-*a* may reuse the trained neural network or trained layer for processing a DMRS.

Therefore, the first set of signals may include a CSI-RS, an SSB, a DMRS, a PRS, or any combination thereof. The second set of signals may include a CSI-RS, an SSB, a DMRS, a PRS, or any combination thereof.

In an example, the source identifier may correspond to CSI-RS, and the target identifier may correspond to DMRS, such that UE 115-*a* may reuse a layer or neural network (e.g., which was trained by CSI-RS) for DMRS. In another example, the source identifier may correspond to SSB, and the target identifier may correspond to demodulation, such that UE 115-*a* may reuse a layer or neural network (e.g., which was trained by SSB) for demodulating other types of signals (e.g., CSI-RS or PRS).

In another example, UE 115-*a* may receive an NNCI 215 indicating to reuse a specific layer of a neural network which UE 115-*a* trained for CSI. UE 115-*a* may reuse the layer for demodulation, and the target identifier may indicate a downlink shared channel or DMRS. Therefore, UE 115-*a* may use a neural network, or a layer of a neural network, which was trained for CSI to demodulate a downlink shared channel, or to demodulate DMRS transmitted for the downlink shared channel.

In another example, UE 115-*a* may receive an NNCI 215 with a source identifier indicating a first neural network and a target identifier indicating CSI-RS. In some cases, UE 115-*a* may train a second neural network based on a first set of weights for the first neural network. For example, UE 115-*a* may base its compression to generate a second set of weights for the second neural network based on the first set of weights for the first neural network.

An NNCI 215 may be configured semi-statically or dynamically. For example, the NNCI 215 may be transmitted semi-statically via a MAC CE, configured via an RRC message, or transmitted in downlink control information on a downlink control channel. An association indicated by the NNCI 215 may be cross-component carrier, cross-band, or cross-band combination. In some cases, specific layers may support cross-component carrier associations. In some cases, the association may be cross-frequency range. For example, a source identifier may be associated with a first frequency range, and a target identifier may be associated with a second frequency range. In some cases, specific layers of a neural network may support cross-frequency range associations.

In some cases, some layers of a neural network may be used for NNCI relations and other layers may not. For example, the feature compression layer may be at the end of the encoding chain, so the feature compression layer may be applicable (e.g., and related or informative) just for the specific signals or procedures which the neural network has been trained on. However, earlier layers may track some long-term components are correlations in a channel, signal, procedure, or any combination thereof, and may be used for other procedures or channels.

In some cases, a first network device (e.g., base station 105-*a*) may both transmit the first set of signals and transmit the NNCI 215. In some other example, UE 115-*a* may train on signals from a first network device and receive the NNCI from a second network device. UE 115-*a* may receive a second set of signals (e.g., which may be associated with the first set of signals, as indicated by the NNCI) from the first network device or the second network device, or a third network device. In some examples described herein, a base station 105 may be described to transmit the NNCI 215. However, any network entity may transmit an NNCI and enable, or support, a UE 115 to reuse a previously trained layer of a neural network or a previously trained neural network.

Figure 3:
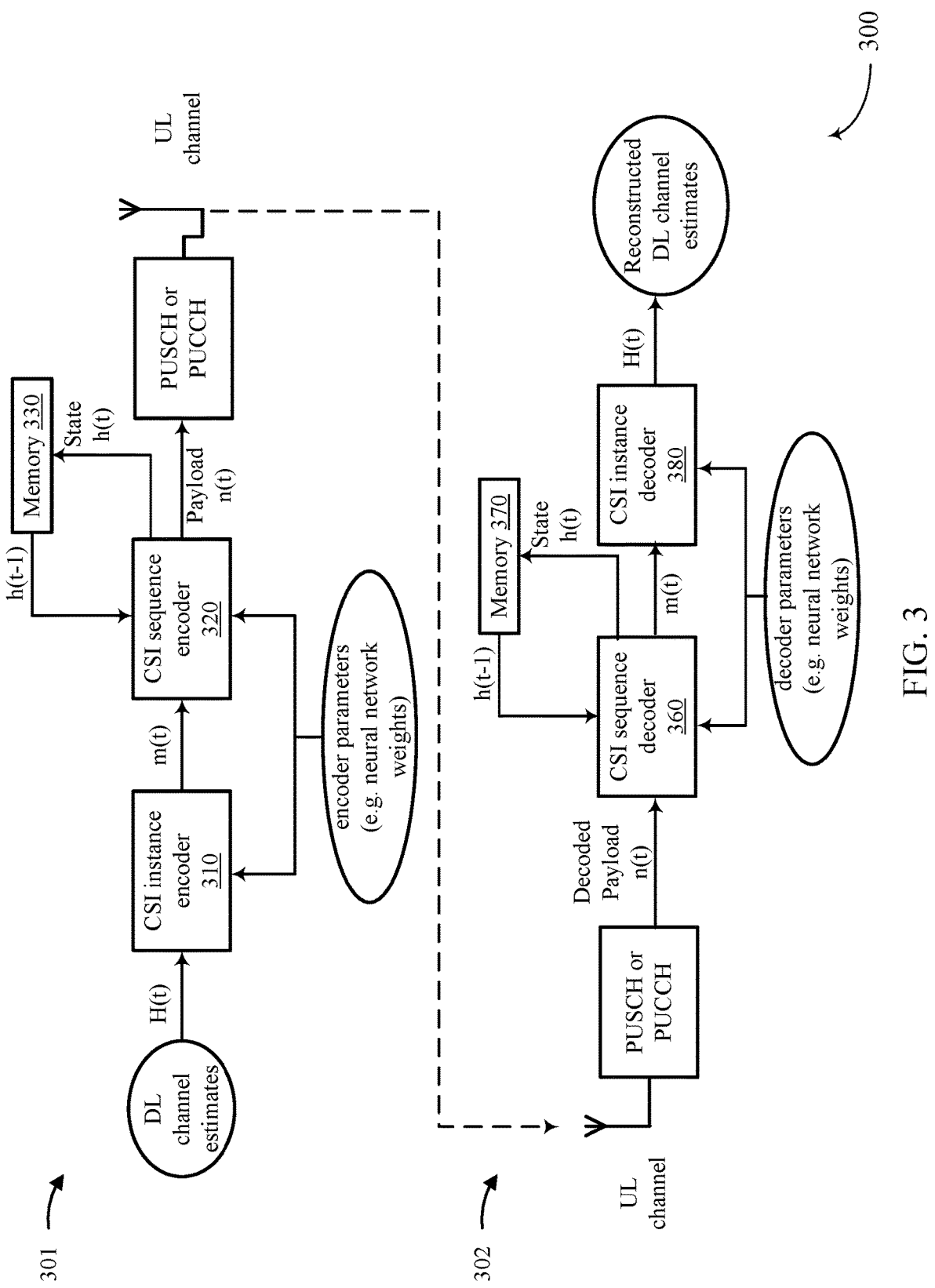
FIG. 3 illustrates an example of a CSI reporting scheme that supports neural network or layer configuration indicator for a CSI scheme in accordance with aspects of the present disclosure.

FIG. 3 illustrates an example of a CSI reporting scheme 300 that supports neural network or layer configuration indicator for a CSI scheme in accordance with aspects of the present disclosure. In some examples, the CSI reporting scheme 300 may implement aspects of wireless communication system 100.

The CSI reporting scheme 300 may include an encoding device 301 and a decoding device 302. In some examples, the encoding device 301 may be an example of a UE 115 as described with reference to FIGS. 1 and 2. The decoding device 302 may be an example of a UE 115, a base station 105, a server, or transmission and reception point, or another network entity as described with reference to FIGS. 1 and 2.

The encoding device 301 may include a CSI instance encoder 310, a CSI sequence encoder 320, and a memory 330. The decoding device 302 may include a CSI sequence decoder 360, a memory 370, and a CSI instance decoder 380.

In some aspects, the encoding device 301 and the decoding device 302 may take advantage of a correlation of CSI instances over time (temporal aspect), or over a sequence of CSI instances for a sequence of channel estimates. The encoding device 301 and the decoding device 302 may save and use previously stored CSI and encode and decode only a change in the CSI from a previous instance. This may provide for less CSI feedback overhead and improve performance. The encoding device 301 may also be able to encode more accurate CSI, and neural networks may be trained with more accurate CSI.

As shown in FIG. 3, CSI instance encoder 310 may encode a CSI instance into intermediate encoded CSI for each downlink channel estimate in a sequence of downlink channel estimates. CSI instance encoder 310 (e.g., a feedforward network) may use neural network encoder weights $\theta$. The intermediate encoded CSI may be represented as $m(t) \triangleq f_{enc,\theta}(H(t))$. CSI sequence encoder 320 (e.g., a Long Short-Term Memory (LSTM) network) may determine a previously encoded CSI instance h(t−1) from memory 330 and compare the intermediate encoded CSI m(t) and the previously encoded CSI instance h(t−1) to determine a change n(t) in the encoded CSI. The change n(t) may be a part of a channel estimate that is new and may not be predicted by the decoding device 302. The encoded CSI at this point may be represented by $[n(t), h_{enc}(t)] \triangleq g_{enc,\theta}(m(t), h_{enc}(t-1))$. CSI sequence encoder 320 may provide this change n(t) on the physical uplink shared channel (PUSCH) or the physical uplink control channel (PUCCH), and the encoding device 301 may transmit the change (e.g., information indicating the change) n(t) as the encoded CSI on the uplink channel to the decoding device 302. Because the change is smaller than an entire CSI instance, the encoding device 301 may send a smaller payload for the encoded CSI on the uplink channel, while including more detailed information in the encoded CSI for the change. CSI sequence encoder 320 may generate encoded CSI h(t) based at least in part on the intermediate encoded CSI m(t) and at least a portion of the previously encoded CSI instance h(t−1). CSI sequence encoder 320 may save the encoded CSI h(t) in memory 330.

CSI sequence decoder 360 may receive encoded CSI on the PUSCH or PUCCH. CSI sequence decoder 360 may determine that only the change n(t) of CSI is received as the encoded CSI. CSI sequence decoder 360 may determine an intermediate decoded CSI m(t) based at least in part on the encoded CSI and at least a portion of a previous intermediate decoded CSI instance h(t−1) from memory 370 and the change. CSI instance decoder 380 may decode the intermediate decoded CSI m(t) into decoded CSI. CSI sequence decoder 360 and CSI instance decoder 380 may use neural network decoder weights $\phi$. The intermediate decoded CSI may be represented by $[\hat{m}(t), h_{dec}(t)] \triangleq g_{dec,\phi}(n(t), h_{dec}(t-1))$. CSI sequence decoder 360 may generate decoded CSI h(t) based at least in part on the intermediate decoded CSI m(t) and at least a portion of the previously decoded CSI instance h(t−1). The decoding device 302 may reconstruct a downlink channel estimate from the decoded CSI h(t), and the reconstructed channel estimate may be represented as H^(t) $\triangleq f_{\_}(dec, \phi)(\hat{m}(t))$. CSI sequence decoder 360 may save the decoded CSI h(t) in memory 370.

Because the change n(t) is smaller than an entire CSI instance, the encoding device 301 may send a smaller payload on the uplink channel. For example, if the downlink channel has changed little from previous feedback, due to a low Doppler or little movement by the encoding device 301, an output of the CSI sequence encoder may be rather compact. In this way, the encoding device 301 may take advantage of a correlation of channel estimates over time. In some aspects, because the output is small, the encoding device 301 may include more detailed information in the encoded CSI for the change. In some aspects, the encoding device 301 may transmit an indication (e.g., flag) to the decoding device 302 that the encoded CSI is temporally encoded (a CSI change). Alternatively, the encoding device 301 may transmit an indication that the encoded CSI is encoded independently of any previously encoded CSI feedback. The decoding device 302 may decode the encoded CSI without using a previously decoded CSI instance. In some aspects, a device, which may include the encoding device 301 or the decoding device 302, may train a neural network model using a CSI sequence encoder and a CSI sequence decoder.

In some aspects, CSI may be a function of a channel estimate (referred to as a channel response) H and interference N. There may be multiple ways to convey H and N. For example, the encoding device 301 may encode the CSI as N^(−½) H. The encoding device 301 may encode H and N separately. The encoding device 301 may partially encode H and N separately, and then jointly encode the two partially encoded outputs. Encoding H and N separately maybe advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the encoding device 301 or the decoding device 302, may train a neural network model using separately encoded H and N.

In some aspects, a reconstructed downlink channel H^ may faithfully reflect the downlink channel H, and this may be called explicit feedback. In some aspects, H^ may capture only that information required for the decoding device 302 to derive rank and precoding. CQI may be fed back separately. CSI feedback may be expressed as m(t), or as n(t) in a scenario of temporal encoding. Similarly to Type-2 CSI feedback, m(t) may be structured to be a concatenation of rank index (RI), beam indices, and coefficients representing amplitudes or phases. In some aspects, m(t) may be a quantized version of a real-valued vector. Beams may be pre-defined (not obtained by training), or may be a part of the training (e.g., part of θ and φ and conveyed to the encoding device 301 or the decoding device 302).

In some aspects, the decoding device 302 and the encoding device 301 may maintain multiple encoder and decoder networks, each targeting a different payload size (for varying accuracy vs. uplink overhead tradeoff). For each CSI feedback, depending on a reconstruction quality and an uplink budget (e.g., PUSCH payload size), the encoding device 301 may choose, or the decoding device 302 may instruct the encoding device 301 to choose, one of the encoders to construct the encoded CSI. The encoding device 301 may send an index of the encoder along with the CSI based at least in part on an encoder chosen by the encoding device 301. Similarly, the decoding device 302 and the encoding device 301 may maintain multiple encoder and decoder networks to cope with different antenna geometries and channel conditions. Note that while some operations are described for the decoding device 302 and the encoding device 301, these operations may also be performed by another device, as part of a preconfiguration of encoder and decoder weights and/or structures.

The CSI reporting scheme 300 may be implemented to support neural network-based CSI reporting. In some cases, the CSI reporting scheme may support reusing a trained layer or a trained neural network for processing other signals or channels. For example, the decoding device 302, or another network entity, may transmit an NNCI to the encoding device 301 including a source identifier and a target identifier. The NNCI may signal to the encoding device 301 that the encoding device 301 can reuse one or more trained layers or neural networks to decode, demodulate, estimate, compress, train, or any combination thereof, another signal or channel. The source identifier may be associated with a first procedure, a first set of signals, a first layer of a neural network, or a first neural network. The target identifier may be associated a second set of signals or a second procedure. The NNCI may indicate that a trained layer or a trained neural network associated with the source identifier may be reused for processing the second set of signals or the second procedure as indicated by the target identifier. The encoding device 301 may be indicated these associations such that the encoding device 301 can avoid cold-start training of a neural network or layer for other purposes. The encoding device 301 may save processing power and latency by reusing a previously trained layer or neural network.

Figure 4:
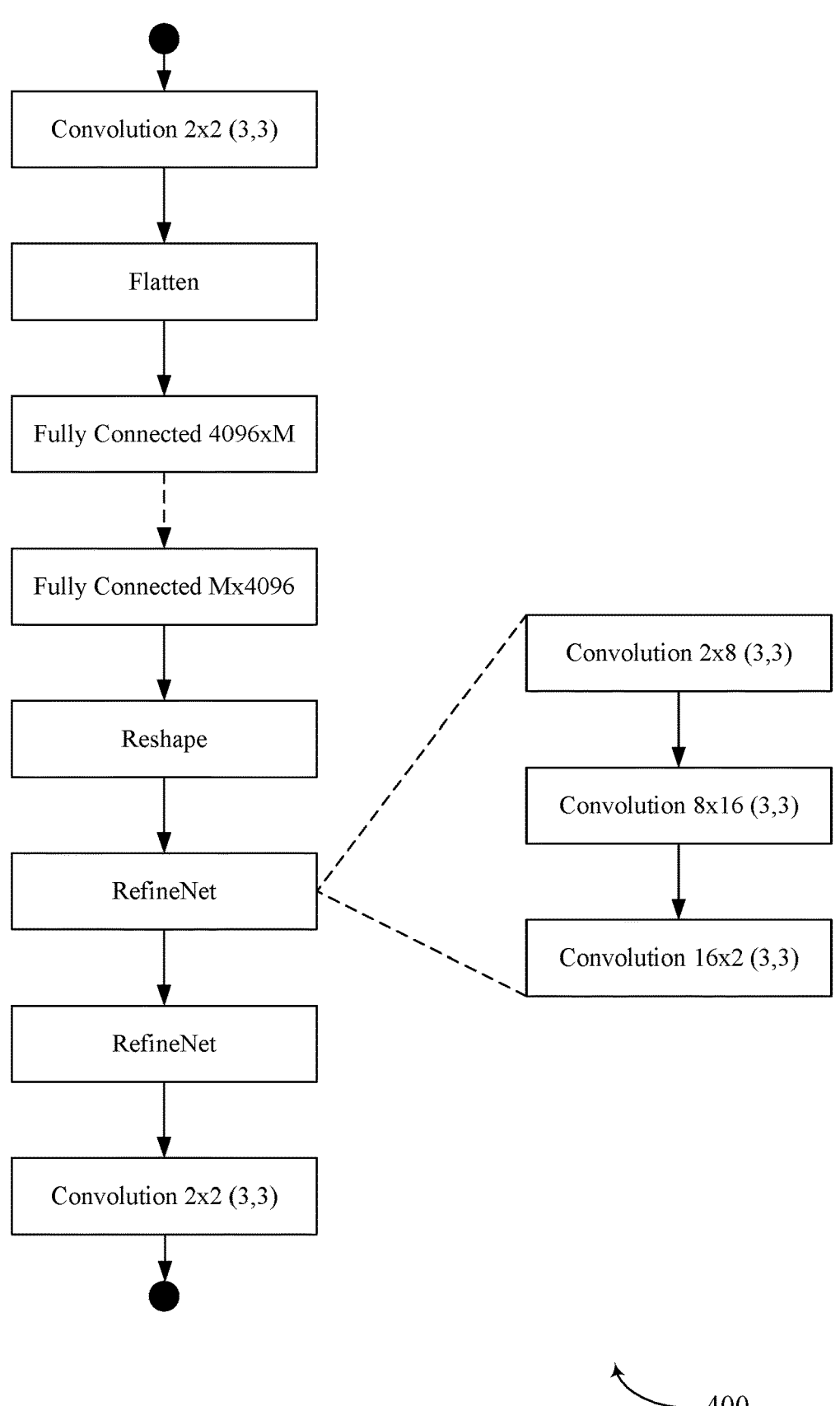
FIG. 4 illustrates an example that supports neural network or layer configuration indicator for a CSI scheme in accordance with aspects of the present disclosure.

FIG. 4 illustrates an example of an example 400 that supports neural network or layer configuration indicator for a CSI scheme in accordance with aspects of the present disclosure. In some examples, the example 400 may implement aspects of wireless communication system 100.

The encoding device (e.g., a UE 115, encoding device 301, and/or the like) may be configured to perform one or more operations on data to compress the data. The decoding device (e.g., a base station 105, decoding device 302, and/or the like) may be configured to decode the compressed data to determine information.

As used herein, a "layer" of a neural network is used to denote an operation on input data. For example, a convolution layer, a fully connected layer, and/or the like denote associated operations on data that is input into a layer. A convolution AxB operation refers to an operation that converts a number of input features A into a number of output features B. "Kernel size" refers to a number of adjacent coefficients that are combined in a dimension.

As used herein, "weight" is used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values.

As shown in example 400, the encoding device may perform a convolution operation on samples. For example, the encoding device may receive a set of bits structured as a 2×64×32 data set that indicates IQ sampling for tap features (e.g., associated with multipath timing offsets) and spatial features (e.g., associated with different antennas of the encoding device). The convolution operation may be a 2×2 operation with kernel sizes of 3 and 3 for the data structure. The output of the convolution operation may be input to a batch normalization (BN) layer followed by a LeakyReLU activation, giving an output data set having dimensions 2×64×32. The encoding device may perform a flattening operation to flatten the bits into a 4096 bit vector. The encoding device may apply a fully connected operation, having dimensions 4096×M, to the 4096 bit vector to output a payload of M bits. The encoding device may transmit the payload of M bits to the decoding device.

The decoding device may apply a fully connected operation, having dimensions M×4096, to the M bit payload to output a 4096 bit vector. The decoding device may reshape the 4096 bit vector to have dimension 2×64×32. The decoding device may apply one or more refinement network (RefineNet) operations on the reshaped bit vector. For example, a RefineNet operation may include application of a 2×8 convolution operation (e.g., with kernel sizes of 3 and 3) with output that is input to a BN layer followed by a LeakyReLU activation that produces an output data set having dimensions 8×64×32, application of an 8×16 convolution operation (e.g., with kernel sizes of 3 and 3) with output that is input to a BN layer followed by a LeakyReLU activation that produces an output data set having dimensions 16×64×32, and/or application of a 16×2 convolution operation (e.g., with kernel sizes of 3 and 3) with output that is input to a BN layer followed by a LeakyReLU activation that produces an output data set having dimensions 2×64× 32. The decoding device may also apply a 2×2 convolution operation with kernel sizes of 3 and 3 to generate decoded and/or reconstructed output.

As indicated above, FIG. 4 is provided merely as an example. Other examples may differ from what is described with regard to FIG. 4.

As described herein, an encoding device operating in a network may measure reference signals and/or the like to report to a decoding device. For example, a UE may measure reference signals during a beam management process to report CSI, may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the network entity may consume communication and/or network resources.

In some aspects described herein, an encoding device (e.g., a UE) may train one or more neural networks to learn dependence of measured qualities on individual parameters, isolate the measured qualities through various layers of the one or more neural networks (also referred to as "operations"), and compress measurements in a way that limits compression loss.

In some aspects, the encoding device may use a nature of a quantity of bits being compressed to construct a step-by-step extraction and compression of each feature (also referred to as a dimension) that affects the quantity of bits. In some aspects, the quantity of bits may be associated with sampling of one or more reference signals and/or may indicate CSI.

Based at least in part on encoding and decoding a data set using a neural network for uplink communication, the encoding device may transmit CSF, or CSI, with a reduced payload. This may conserve network resources that may otherwise have been used to transmit a full data set as sampled by the encoding device.

The example 400 may support reusing one or more trained layers of a neural network to process other signals or channels. For example, the decoding device 302, or another network entity, may transmit an indication, such as an NNCI, to the encoding device 301 including a source identifier and a target identifier of associated signals, channels, or layers. The NNCI may indicate that the encoding device 301 can reuse one or more trained layers or neural networks to decode, demodulate, estimate, compress, train, or any combination thereof, an indicated signal or channel (e.g., corresponding to the target identifier). The source identifier may be associated with a first procedure, a first set of signals, a first layer of a neural network, or a first neural network. The target identifier may be associated a second set of signals or a second procedure. The NNCI may indicate that a trained layer or a trained neural network associated with the source identifier may be reused for processing the second set of signals or the second procedure as indicated by the target identifier.

Figure 5:
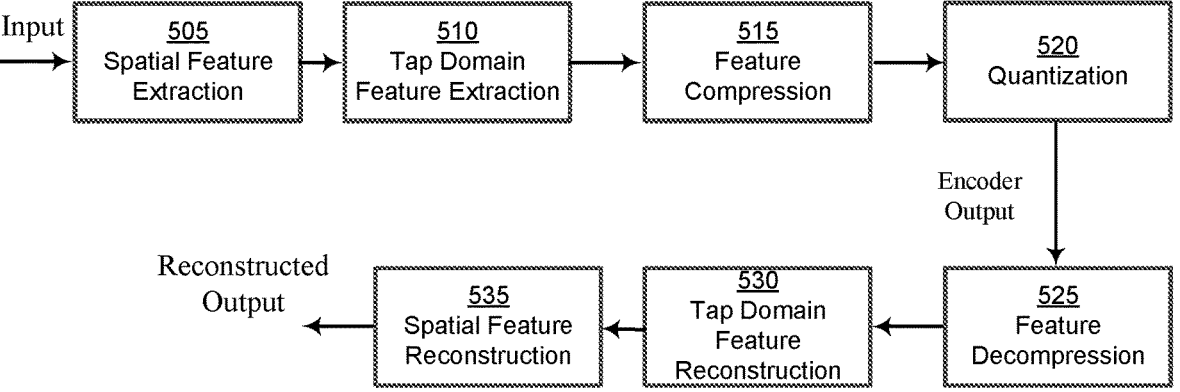
FIG. 5 illustrates an example that supports neural network or layer configuration indicator for a CSI scheme in accordance with aspects of the present disclosure.

FIG. 5 illustrates an example of an example 500 that supports neural network or layer configuration indicator for a CSI scheme in accordance with aspects of the present disclosure. In some examples, the example 500 may implement aspects of wireless communication system 100. An encoding device (e.g., UE 115, encoding device 301, and/or the like) may be configured to perform one or more operations on samples (e.g., data) received via one or more antennas of the encoding device to compress the samples. A decoding device (e.g., base station 105, decoding device 302, and/or the like) may be configured to decode the compressed samples to determine information, such as CSF.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions.

In some aspects, the reference numbers identify operations that include multiple neural network layers and/or operations. Neural networks of the encoding device and the decoding device may be formed by concatenation of one or more of the referenced operations.

As shown by reference number 505, the encoding device may perform a spatial feature extraction on the data. As shown by reference number 510, the encoding device may perform a tap domain feature extraction on the data. In some aspects, the encoding device may perform the tap domain feature extraction before performing the spatial feature extraction. In some aspects, an extraction operation may include multiple operations. For example, the multiple operations may include one or more convolution operations, one or more fully connected operations, and/or the like, that may be activated or inactive. In some aspects, an extraction operation may include a residual neural network (ResNet) operation.

As shown by reference number 515, the encoding device may compress one or more features that have been extracted. In some aspects, a compression operation may include one or more operations, such as one or more convolution operations, one or more fully connected operations, and/or the like. After compression, a bit count of an output may be less than a bit count of an input.

As shown by reference number 520, the encoding device may perform a quantization operation. In some aspects, the encoding device may perform the quantization operation after flattening the output of the compression operation and/or performing a fully connected operation after flattening the output.

As shown by reference number 525, the decoding device may perform a feature decompression. As shown by reference number 530, the decoding device may perform a tap domain feature reconstruction. As shown by reference number 535, the decoding device may perform a spatial feature reconstruction. In some aspects, the decoding device may perform spatial feature reconstruction before performing tap domain feature reconstruction. After the reconstruction operations, the decoding device may output the reconstructed version of the encoding device's input.

In some aspects, the decoding device may perform operations in an order that is opposite to operations performed by the encoding device. For example, if the encoding device follows operations (a, b, c, d), the decoding device may follow inverse operations (D, C, B, A). In some aspects, the decoding device may perform operations that are fully symmetric to operations of the encoding device. This may reduce a number of bits needed for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSF with a reduced payload. This may conserve network resources that may otherwise have been used to transmit a full data set as sampled by the encoding device.

The example 500 may support reusing one or more trained layers of a neural network to process other signals or channels. For example, the decoding device, or another network entity, may transmit an indication, such as an NNCI, to the encoding device including a source identifier and a target identifier of associated signals, channels, or layers. The NNCI may indicate that the encoding device can reuse one or more trained layers or neural networks to decode, demodulate, estimate, compress, train, or any combination thereof, an indicated signal or channel (e.g., corresponding to the target identifier). The source identifier may be associated with a first procedure, a first set of signals, a first layer of a neural network, or a first neural network. The target identifier may be associated a second set of signals or a second procedure. The NNCI may indicate that a trained layer or a trained neural network associated with the source identifier may be reused for processing the second set of signals or the second procedure as indicated by the target identifier.

As indicated above, FIG. 5 is provided merely as an example. Other examples may differ from what is described with regard to FIG. 5.

Figure 6:
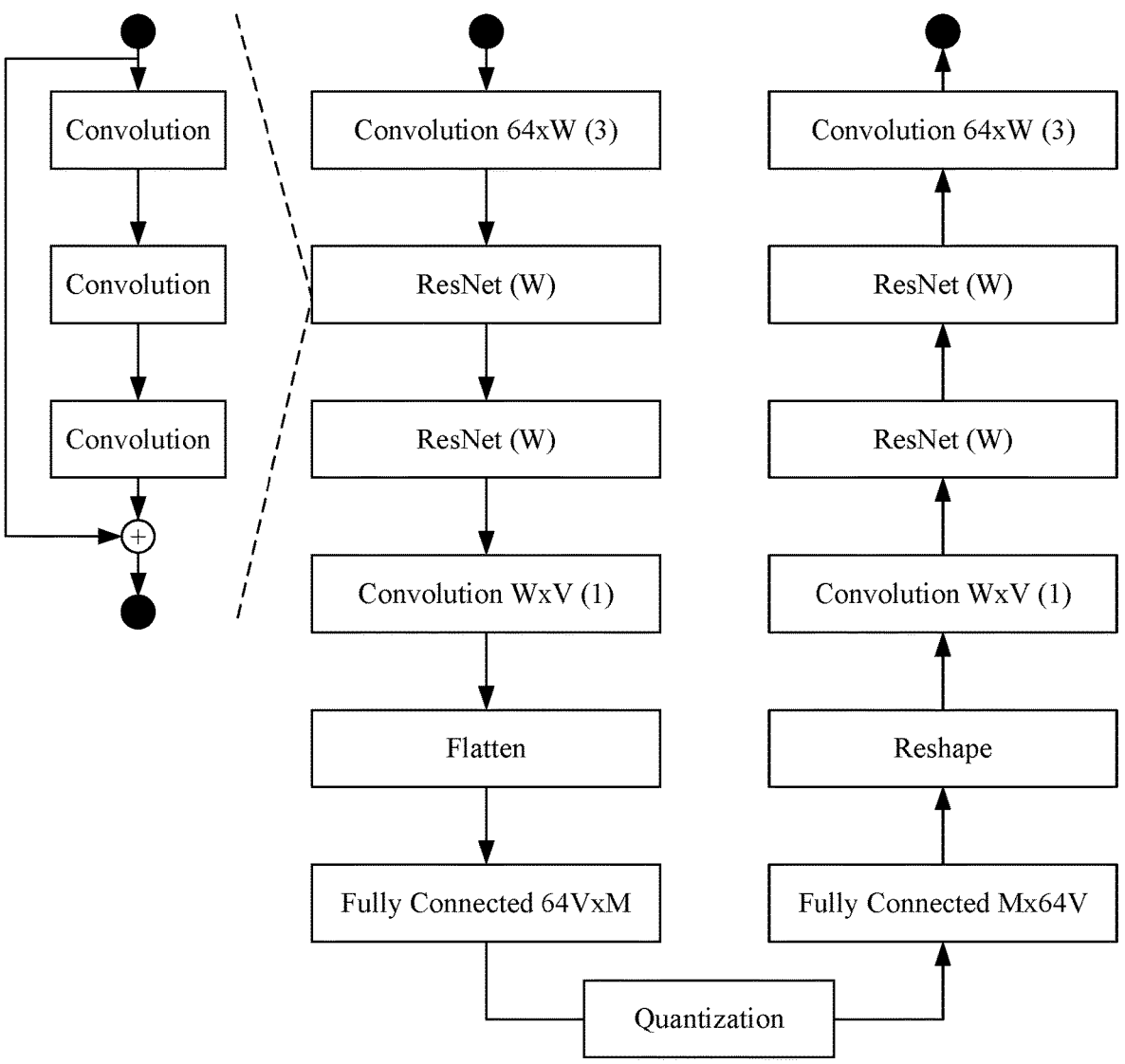
FIG. 6 illustrates an example that supports neural network or layer configuration indicator for a CSI scheme in accordance with aspects of the present disclosure.

FIG. 6 illustrates an example of an example 600 that supports neural network or layer configuration indicator for a CSI scheme in accordance with aspects of the present disclosure. In some examples, the example 600 may implement aspects of wireless communication system 100.

An encoding device (e.g., a UE 115, encoding device 301, and/or the like) may be configured to perform one or more operations on samples (e.g., data) received via one or more antennas of the encoding device to compress the samples. A decoding device (e.g., a base station 105, decoding device 302, and/or the like) may be configured to decode the compressed samples to determine information, such as CSF.

As shown by example 600, the encoding device may receive sampling from antennas. For example, the encoding device may receive a 64×64 dimension data set based at least in part on a number of antennas, a number of samples per antenna, and a tap feature.

The encoding device may perform a spatial feature extraction, a short temporal (tap) feature extraction, and/or the like. In some aspects, this may be accomplished through the use of a 1-dimensional convolutional operation, that is fully connected in the spatial dimension (to extract the spatial feature) and simple convolution with a small kernel size (e.g., 3) in the tap dimension (to extract the short tap feature). Output from such a 64×W 1-dimensional convolution operation may be a W×64 matrix.

The encoding device may perform one or more ResNet operations. The one or more ResNet operations may further refine the spatial feature and/or the temporal feature. In some aspects, a ResNet operation may include multiple operations associated with a feature. For example, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The encoding device may perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation has an input of W features and an output of V features. Output from the W×V convolution operation may be a V×64 matrix.

The encoding device may perform a flattening operation to flatten the V×64 matrix into a 64V element vector. The encoding device may perform a 64V×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64V fully connected operation to decompress the low dimension vector of size M into a spatial-temporal feature data set. The decoding device may perform a reshaping operation to reshape the 64V element vector into a 2-dimensional V×64 matrix. The decoding device may perform a V×W (with kernel of 1) convolution operation on output from the reshaping operation. The V×W convolution operation may include a point-wise (e.g., tap-wise) convolution operation. The V×W convolution operation may decompress spatial features from a reduced dimension for each tap. The V×W convolution operation has an input of V features and an output of W features. Output from the V×W convolution operation may be a W×64 matrix.

The decoding device may perform one or more ResNet operations. The one or more ResNet operations may further decompress the spatial feature and/or the temporal feature. In some aspects, a ResNet operation may include multiple (e.g., 3) 1-dimensional convolution operations, a skip connection (e.g., to avoid application of the 1-dimensional convolution operations), a summation operation of a path through the multiple convolution operations and a path through the skip connection, and/or the like. Output from the one or more ResNet operations may be a W×64 matrix.

The decoding device may perform a spatial and temporal feature reconstruction. In some aspects, this may be accomplished through the use of a 1-dimensional convolutional operation that is fully connected in the spatial dimension (to reconstruct the spatial feature) and simple convolution with a small kernel size (e.g., 3) in the tap dimension (to reconstruct the short tap feature). Output from the 64×W convolution operation may be a 64×64 matrix. In some aspects, values of M, W, and/or V may be configurable to adjust weights of the features, payload size, and/or the like.

The example 600 may support reusing one or more trained layers of a neural network to process other signals or channels. The example 600 may include an example of a neural network at an encoding device and a neural network at a decoding device, which may be used for neural network-based CSI reporting. In some cases, a process or layer described by the example 600 may produce a set of weights which may be reused to expedite processing a different signal or channel. For example, the decoding device, or another network entity, may transmit an indication, such as an NNCI, to the encoding device including a source identifier and a target identifier of associated signals, channels, or layers. The NNCI may indicate that the encoding device can reuse one or more trained layers or neural networks to decode, demodulate, estimate, compress, train, or any combination thereof, an indicated signal or channel (e.g., corresponding to the target identifier). The source identifier may be associated with a first procedure, a first set of signals, a first layer of a neural network, or a first neural network. The target identifier may be associated a second set of signals or a second procedure. The NNCI may indicate that a trained layer or a trained neural network associated with the source identifier may be reused for processing the second set of signals or the second procedure as indicated by the target identifier.

As indicated above, FIG. 6 is provided merely as an example. Other examples may differ from what is described with regard to FIG. 6.

Figure 7:
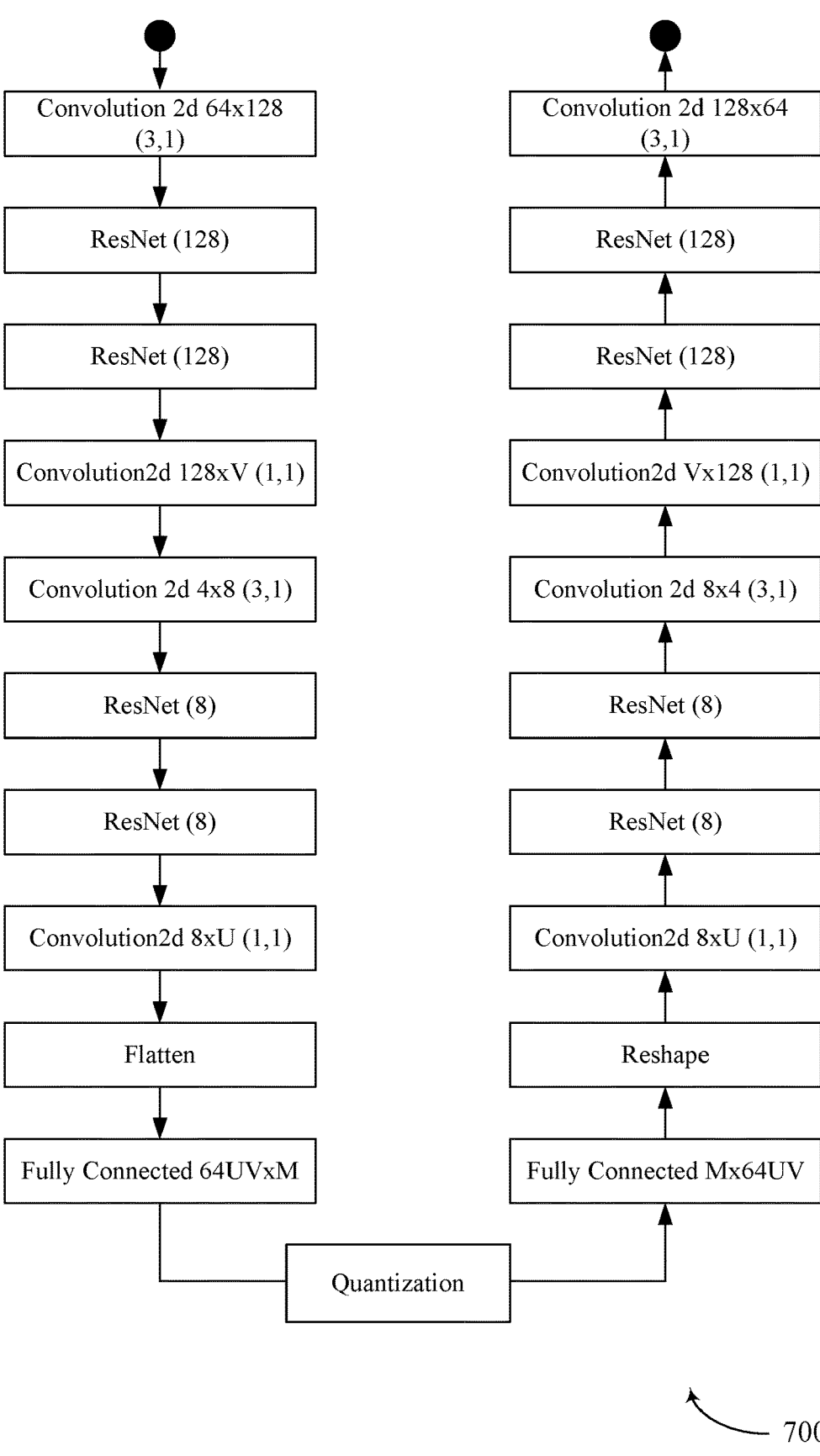
FIG. 7 illustrates an example that supports neural network or layer configuration indicator for a CSI scheme in accordance with aspects of the present disclosure.

FIG. 7 illustrates an example of an example 700 that supports neural network or layer configuration indicator for a CSI scheme in accordance with aspects of the present disclosure. In some examples, the example 700 may implement aspects of wireless communication system 100.

An encoding device (e.g., UE 115, encoding device 301, and/or the like) may be configured to perform one or more operations on samples (e.g., data) received via one or more antennas of the encoding device to compress the samples. A decoding device (e.g., base station 105, decoding device 302, and/or the like) may be configured to decode the compressed samples to determine information, such as CSF. As shown by example 700, features may be compressed and decompressed in sequence. For example, the encoding device may extract and compress features associated with the input to produce a payload, and then the decoding device may extract and compress features associated with the payload to reconstruct the input. The encoding and decoding operations may be symmetric (as shown) or asymmetric.

As shown by example 700, the encoding device may receive sampling from antennas. For example, the encoding device may receive a 256×64 dimension data set based at least in part on a number of antennas, a number of samples per antenna, and a tap feature. The encoding device may reshape the data to a (64×64×4) data set.

The encoding device may perform a 2-dimensional 64×128 convolution operation (with kernel sizes of 3 and 1). In some aspects, the 64×128 convolution operation may perform a spatial feature extraction associated with the decoding device antenna dimension, a short temporal (tap) feature extraction associated with the decoding device (e.g., base station) antenna dimension, and/or the like. In some aspects, this may be accomplished through the use of a 2D convolutional layer that is fully connected in a decoding device antenna dimension, a simple convolutional operation with a small kernel size (e.g., 3) in the tap dimension and a small kernel size (e.g., 1) in the encoding device antenna dimension. Output from the 64×W convolution operation may be a (128×64×4) dimension matrix.

The encoding device may perform one or more ResNet operations. The one or more ResNet operations may further refine the spatial feature associated with the decoding device and/or the temporal feature associated with the decoding device. In some aspects, a ResNet operation may include multiple operations associated with a feature. For example, a ResNet operation may include multiple (e.g., 3) 2-dimensional convolution operations, a skip connection (e.g., between input of the ResNet and output of the ResNet to avoid application of the 2-dimensional convolution operations), a summation operation of a path through the multiple 2-dimensional convolution operations and a path through the skip connection, and/or the like. In some aspects, the multiple 2-dimensional convolution operations may include a W×2 W convolution operation with kernel sizes 3 and 1 with output that is input to a BN layer followed by a LeakyReLU activation that produces an output data set of dimension 2W×64×V, a 2W×4 W convolution operation with kernel sizes 3 and 1 with output that is input to a BN layer followed by a LeakyReLU activation that produces an output data set of dimension 4W×64×V, and 4W×W convolution operation with kernel sizes 3 and 1 that outputs a BN data set of dimension (128×64×4). Output from the one or more ResNet operations may be a (128×64×4) dimension matrix.

The encoding device may perform a 2-dimensional 128×V convolution operation (with kernel sizes of 1 and 1) on output from the one or more ResNet operations. The 128×V convolution operation may include a pointwise (e.g., tap-wise) convolution operation. The W×V convolution operation may compress spatial features associated with the decoding device into a reduced dimension for each tap. Output from the 128×V convolution operation may be a (4×64×V) dimension matrix.

The encoding device may perform a 2-dimensional 4×8 convolution operation (with kernel sizes of 3 and 1). In some aspects, the 4×8 convolution operation may perform a spatial feature extraction associated with the encoding device antenna dimension, a short temporal (tap) feature extraction associated with the encoding device antenna dimension, and/or the like. Output from the 4×8 convolution operation may be a (8×64×V) dimension matrix.

The encoding device may perform one or more ResNet operations. The one or more ResNet operations may further refine the spatial feature associated with the encoding device and/or the temporal feature associated with the encoding device. In some aspects, a ResNet operation may include multiple operations associated with a feature. For example, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension matrix.

The encoding device may perform a 2-dimensional 8×U convolution operation (with kernel sizes of 1 and 1) on output from the one or more ResNet operations. The 8×U convolution operation may include a pointwise (e.g., tap-wise) convolution operation. The 8×U convolution operation may compress spatial features associated with the decoding device into a reduced dimension for each tap. Output from the 128×V convolution operation may be a (U×64×V) dimension matrix.

The encoding device may perform a flattening operation to flatten the (U×64×V) dimension matrix into a 64UV element vector. The encoding device may perform a 64UV×M fully connected operation to further compress a 2-dimensional spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64UV fully connected operation to decompress the low dimension vector of size M into a spatial-temporal feature data set. The decoding device may perform a reshaping operation to reshape the 64UV element vector into a (U×64×V) dimensional matrix. The decoding device may perform a 2-dimensional U×8 (with kernel of 1, 1) convolution operation on output from the reshaping operation. The U×8 convolution operation may include a pointwise (e.g., tap-wise) convolution operation. The U×8 convolution operation may decompress spatial features from a reduced dimension for each tap. Output from the U×8 convolution operation may be a (8×64×V) dimension data set.

The decoding device may perform one or more ResNet operations. The one or more ResNet operations may further decompress the spatial feature and/or the temporal feature associated with the encoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension data set.

The decoding device may perform a 2-dimensional 8×4 convolution operation (with kernel sizes of 3 and 1). In some aspects, the 8×4 convolution operation may perform a spatial feature reconstruction in the encoding device antenna dimension, and a short temporal feature reconstruction, and/or the like. Output from the 8×4 convolution operation may be a (V×64×4) dimension data set.

The decoding device may perform a 2-dimensional V×128 (with kernel of 1) convolution operation on output from the 2-dimensional 8×4 convolution operation to reconstruct a tap feature and a spatial feature associated with the decoding device. The V×128 convolution operation may include a pointwise (e.g., tap-wise) convolution operation. The V×128 convolution operation may decompress spatial features associated with the decoding device antennas from a reduced dimension for each tap. Output from the U×8 convolution operation may be a (128×64×4) dimension matrix.

The decoding device may perform one or more ResNet operations. The one or more ResNet operations may further decompress the spatial feature and/or the temporal feature associated with the decoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (128×64×4) dimension matrix.

The decoding device may perform a 2-dimensional 128×64 convolution operation (with kernel sizes of 3 and 1). In some aspects, the 128×64 convolution operation may perform a spatial feature reconstruction associated with the decoding device antenna dimension, a short temporal feature reconstruction, and/or the like. Output from the 128×64 convolution operation may be a (64×64×4) dimension data set.

In some aspects, values of M, V, and/or U may be configurable to adjust weights of the features, payload size, and/or the like. For example, a value of M may be 32, 64, 128, 256, or 512, a value of V may be 16, and/or a value of U may be 1.

The example 700 may support reusing one or more trained layers of a neural network to process other signals or channels. The example 700 may include an example of a neural network at an encoding device and a neural network at a decoding device, which may be used for neural network-based CSI reporting. In some cases, a process or layer described by the example 600 may produce a set of weights which may be reused to efficiently process a different signal or channel.

As indicated above, FIG. 7 is provided merely as an example. Other examples may differ from what is described with regard to FIG. 7.

Figure 8:
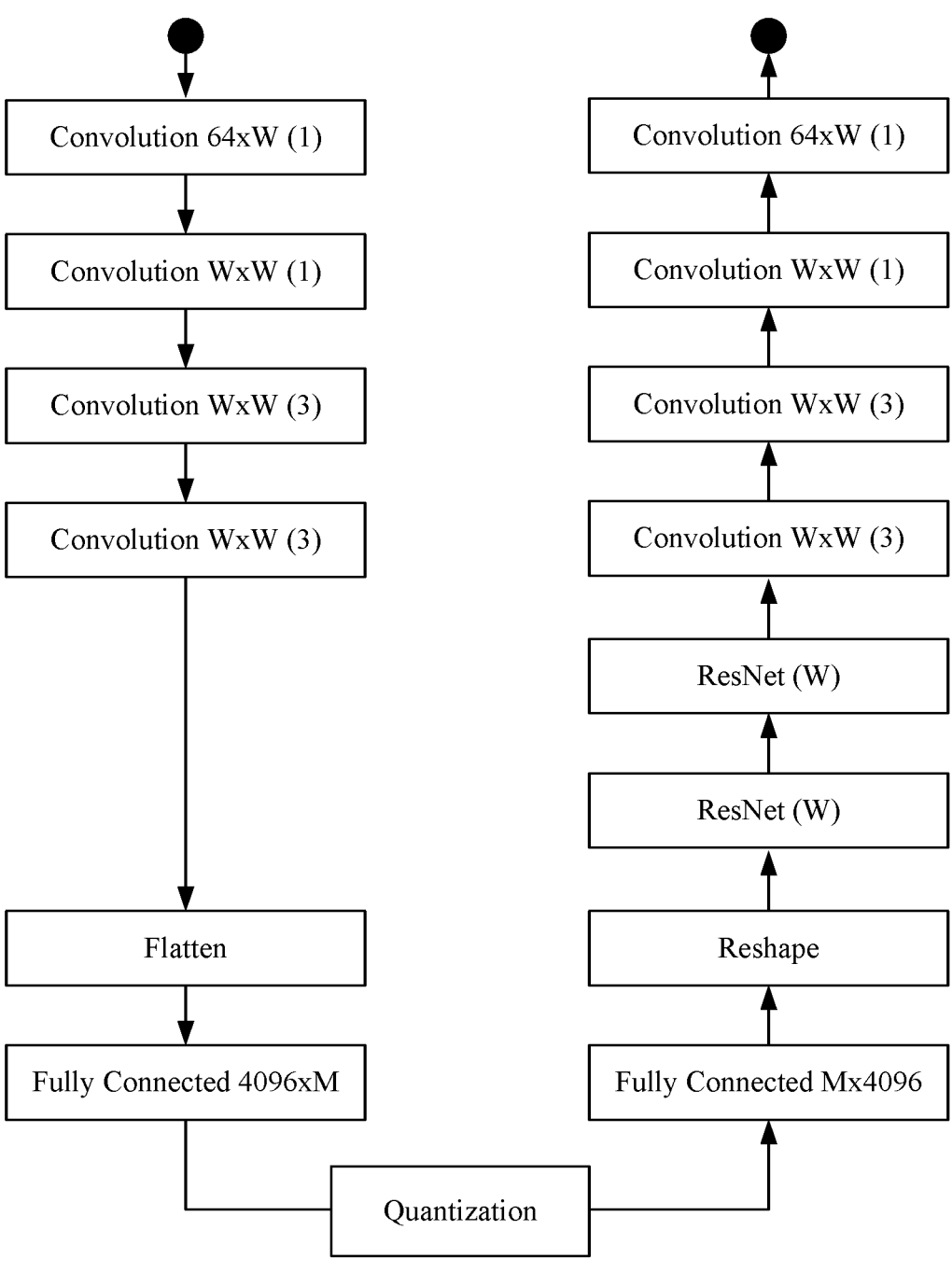
FIG. 8 illustrates an example that supports neural network or layer configuration indicator for a CSI scheme in accordance with aspects of the present disclosure.

FIG. 8 illustrates an example of an example 800 that supports neural network or layer configuration indicator for a CSI scheme in accordance with aspects of the present disclosure. In some examples, the example 800 may implement aspects of wireless communication system 100.

An encoding device (e.g., a UE 115, encoding device 301, and/or the like) may be configured to perform one or more operations on samples (e.g., data) received via one or more antennas of the encoding device to compress the samples. A decoding device (e.g., a base station 105, decoding device 302, and/or the like) may be configured to decode the compressed samples to determine information, such as CSF. The encoding device and decoding device operations may be asymmetric. In other words, the decoding device may have a greater number of layers than the decoding device.

As shown by example 800, the encoding device may receive sampling from antennas. For example, the encoding device may receive a 64×64 dimension data set based at least in part on a number of antennas, a number of samples per antenna, and a tap feature.

The encoding device may perform a 64×W convolution operation (with a kernel size of 1). In some aspects, the 64×W convolution operation may be fully connected in antennas, convolution in taps, and/or the like. Output from the 64×W convolution operation may be a W×64 matrix. The encoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the one or more W×W convolution operations may perform a spatial feature extraction, a short temporal (tap) feature extraction, and/or the like. In some aspects, the W×W convolution operations may be a series of 1-dimensional convolution operations.

The encoding device may perform a flattening operation to flatten the W×64 matrix into a 64 W element vector. The encoding device may perform a 4096×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform a 4096×M fully connected operation to decompress the low dimension vector of size M into a spatial-temporal feature data set. The decoding device may perform a reshaping operation to reshape the 6 W element vector into a W×64 matrix.

The decoding device may perform one or more ResNet operations. The one or more ResNet operations may decompress the spatial feature and/or the temporal feature. In some aspects, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensional convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The decoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the W×W convolution operations may perform a spatial feature reconstruction, a short temporal (tap) feature reconstruction, and/or the like. In some aspects, the W×W convolution operations may be a series of 1-dimensional convolution operations.

The encoding device may perform a W×64 convolution operation (with a kernel size of 1). In some aspects, the W×64 convolution operation may be a 1-dimensional convolution operation. Output from the 64×W convolution operation may be a 64×64 matrix. In some aspects, values of M, and/or W may be configurable to adjust weights of the features, payload size, and/or the like.

As indicated above, FIG. 8 is provided merely as an example. Other examples may differ from what is described with regard to FIG. 8.

FIG. 9 illustrates an example of an example process 900 that supports neural network or layer configuration indicator for a CSI scheme in accordance with aspects of the present disclosure. In some examples, the example process 900 may implement aspects of wireless communication system 100.

Example process 900 is an example where the first device (e.g., an encoding device, a UE 115, a device 1205, 1305, 1405, or 1505 of FIGS. 12 through 15, and/or the like) performs operations associated with encoding a data set using a neural network.

As shown in FIG. 9, in some aspects, process 900 may include encoding a data set using one or more extraction operations and compression operations associated with a neural network, the one or more extraction operations and compression operations being based at least in part on a set of features of the data set to produce a compressed data set (block 910). For example, the first device (e.g., a communications manager 1215) may encode a data set using one or more extraction operations and compression operations associated with a neural network, the one or more extraction operations and compression operations being based at least in part on a set of features of the data set to produce a compressed data set, as described above.

As further shown in FIG. 9, in some aspects, process 900 may include transmitting the compressed data set to a second device (block 920). For example, the first device (e.g., using a transmitter 1220) may transmit the compressed data set to a second device, as described above.

Process 900 may include additional aspects, such as any single aspect or any combination of aspects described below and/or in connection with one or more other processes described elsewhere herein.

In a first aspect, the data set is based at least in part on sampling of one or more reference signals.

In a second aspect, alone or in combination with the first aspect, transmitting the compressed data set to the second device includes transmitting CSI feedback to the second device.

In a third aspect, alone or in combination with one or more of the first and second aspects, process 900 includes identifying the set of features of the data set, wherein the one or more extraction operations and compression operations includes a first type of operation performed in a dimension associated with a feature of the set of features of the data set, and a second type of operation, that is different from the first type of operation, performed in remaining dimensions associated with other features of the set of features of the data set.

In a fourth aspect, alone or in combination with one or more of the first through third aspects, the first type of operation includes a one-dimensional fully connected layer operation, and the second type of operation includes a convolution operation.

In a fifth aspect, alone or in combination with one or more of the first through fourth aspects, the one or more extraction operations and compression operations include multiple operations that include one or more of a convolution operation, a fully connected layer operation, or a residual neural network operation.

In a sixth aspect, alone or in combination with one or more of the first through fifth aspects, the one or more extraction operations and compression operations include a first extraction operation and a first compression operation performed for a first feature of the set of features of the data set, and a second extraction operation and a second compression operation performed for a second feature of the set of features of the data set.

In a seventh aspect, alone or in combination with one or more of the first through sixth aspects, process 900 includes performing one or more additional operations on an intermediate data set that is output after performing the one or more extraction operations and compression operations.

In an eighth aspect, alone or in combination with one or more of the first through seventh aspects, the one or more additional operations include one or more of a quantization operation, a flattening operation, or a fully connected operation.

In a ninth aspect, alone or in combination with one or more of the first through eighth aspects, the set of features of the data set includes one or more of a spatial feature, or a tap domain feature.

In a tenth aspect, alone or in combination with one or more of the first through ninth aspects, the one or more extraction operations and compression operations include one or more of a spatial feature extraction using a one-dimensional convolution operation, a temporal feature extraction using a one-dimensional convolution operation, a residual neural network operation for refining an extracted spatial feature, a residual neural network operation for refining an extracted temporal feature, a pointwise convolution operation for compressing the extracted spatial feature, a pointwise convolution operation for compressing the extracted temporal feature, a flattening operation for flattening the extracted spatial feature, a flattening operation for flattening the extracted temporal feature, or a compression operation for compressing one or more of the extracted temporal feature or the extracted spatial feature into a low dimension vector for transmission.

In an eleventh aspect, alone or in combination with one or more of the first through tenth aspects, the one or more extraction operations and compression operations include a first feature extraction operation associated with one or more features that are associated with a second device, a first compression operation for compressing the one or more features that are associated with the second device, a second feature extraction operation associated with one or more features that are associated with the first device, and a second compression operation for compressing the one or more features that are associated with the first device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 illustrates an example of an example process 1000 that supports neural network or layer configuration indicator for a CSI scheme in accordance with aspects of the present disclosure. In some examples, the example process 1000 may implement aspects of wireless communication system 100. Example process 1000 is an example where the second device (e.g., a decoding device, a UE 115, a base station 105, a device 1205, 1305, 1405, or 1505 of FIGS. 12 through 15, or a device 1605, 1705, 1805, or 1905 of FIGS. 16 through 19, and/or the like) performs operations associated with decoding a data set using a neural network.

As shown in FIG. 10, in some aspects, process 1000 may include receiving, from a first device, a compressed data set (block 1010). For example, the second device (e.g., using receiver 1210) may receive, from a first device, a compressed data set, as described above.

As further shown in FIG. 10, in some aspects, process 1000 may include decoding the compressed data set using one or more decompression operations and reconstruction operations associated with a neural network, the one or more decompression and reconstruction operations being based at least in part on a set of features of the compressed data set to produce a reconstructed data set (block 1020). For example, the second device (e.g., using a communications manager 1215) may decode the compressed data set using one or more decompression operations and reconstruction operations associated with a neural network, the one or more decompression and reconstruction operations being based at least in part on a set of features of the compressed data set to produce a reconstructed data set, as described above.

Process 1000 may include additional aspects, such as any single aspect or any combination of aspects described below and/or in connection with one or more other processes described elsewhere herein.

In a first aspect, decoding the compressed data set using the one or more decompression operations and reconstruction operations includes performing the one or more decompression operations and reconstruction operations based at least in part on an assumption that the first device generated the compressed data set using a set of operations that are symmetric to the one or more decompression operations and reconstruction operations, or performing the one or more decompression operations and reconstruction operations based at least in part on an assumption that the first device generated the compressed data set using a set of operations that are asymmetric to the one or more decompression operations and reconstruction operations.

In a second aspect, alone or in combination with the first aspect, the compressed data set is based at least in part on sampling by the first device of one or more reference signals.

In a third aspect, alone or in combination with one or more of the first and second aspects, receiving the compressed data set includes receiving CSI feedback from the first device.

In a fourth aspect, alone or in combination with one or more of the first through third aspects, the one or more decompression operations and reconstruction operations include a first type of operation performed in a dimension associated with a feature of the set of features of the compressed data set, and a second type of operation, that is different from the first type of operation, performed in remaining dimensions associated with other features of the set of features of the compressed data set.

In a fifth aspect, alone or in combination with one or more of the first through fourth aspects, the first type of operation includes a one-dimensional fully connected layer operation, and wherein the second type of operation includes a convolution operation.

In a sixth aspect, alone or in combination with one or more of the first through fifth aspects, the one or more decompression operations and reconstruction operations include multiple operations that include one or more of a convolution operation, a fully connected layer operation, or a residual neural network operation.

In a seventh aspect, alone or in combination with one or more of the first through sixth aspects, the one or more decompression operations and reconstruction operations include a first operation performed for a first feature of the set of features of the compressed data set, and a second operation performed for a second feature of the set of features of the compressed data set.

In an eighth aspect, alone or in combination with one or more of the first through seventh aspects, process 1000 includes performing a reshaping operation on the compressed data set.

In a ninth aspect, alone or in combination with one or more of the first through eighth aspects, the set of features of the compressed data set include one or more of a spatial feature, or a tap domain feature.

In a tenth aspect, alone or in combination with one or more of the first through ninth aspects, the one or more decompression operations and reconstruction operations include one or more of a feature decompression operation, a temporal feature reconstruction operation, or a spatial feature reconstruction operation.

In an eleventh aspect, alone or in combination with one or more of the first through tenth aspects, the one or more decompression operations and reconstruction operations include a first feature reconstruction operation performed for one or more features associated with the first device, and a second feature reconstruction operation performed for one or more features associated with the second device.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
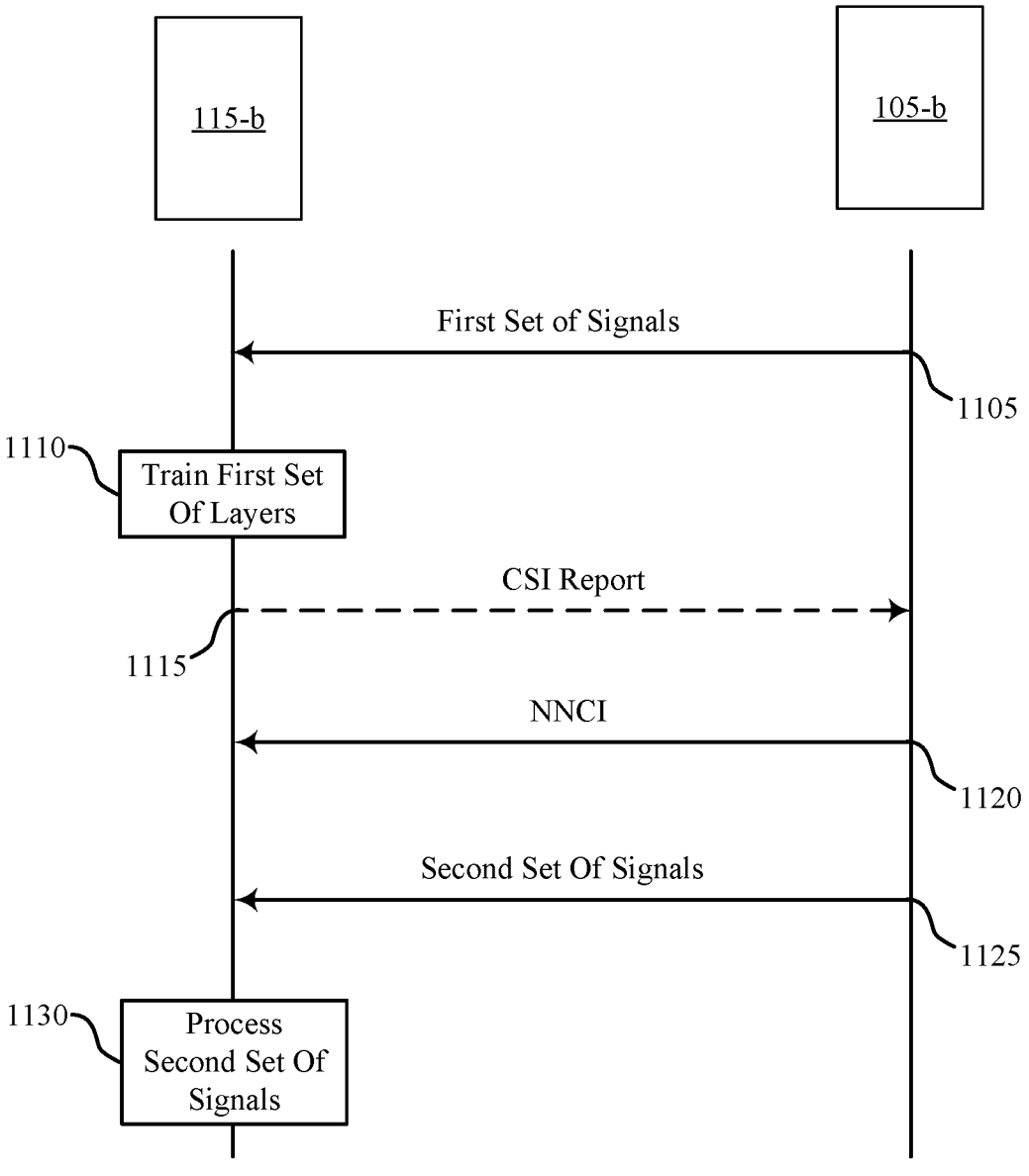
FIG. 11 illustrates an example of a process flow that supports neural network or layer configuration indicator for a CSI scheme in accordance with aspects of the present disclosure.

FIG. 11 illustrates an example of a process flow 1100 that supports neural network or layer configuration indicator for a CSI scheme in accordance with aspects of the present disclosure. In some examples, the process flow 1100 may implement aspects of wireless communication system 100. The process flow 1100 may include UE 115-*b* and base station 105-*b*, which may be respective examples of a UE 115 and a base station 105. In some cases, UE 115-*b* may be an example of an encoding device described herein, and base station 105-*b* may be an example of a decoding device described herein. In some additional, or alternative, examples, a UE 115, a server, a transmission point, or another network entity may be an example of a decoding device. For example, the process flow 1100 may be implemented by two UEs 115, a UE 115 and a server, a UE 115 and a transmission point, a UE 115 and a network entity, or any combination thereof, where a UE 115 may receive an NNCI and process signals for any one or more of the described devices or entities according to the NNCI.

At 1105, base station 105-*b* may transmit a first set of one or more signals to UE 115-*b*. UE 115-*b* may train a first set of layers of a neural network based on channel estimates using a set of resources. For example, UE 115-*b* may train the first set of layers of the neural network based on measurements, estimates, etc. on the first set of one or more signals. UE 115-*b* may generate a set of weights for the first set of layers of the neural network based on the training. In some cases, the set of weights may correspond to a compressed representation of the channel. For example, the set of weights may be used to reconstruct the channel as received by UE 115-*b*. In some cases, the channel may be an example of a downlink channel from base station 105-*b* to UE 115-*b*. In some other examples, the channel may be an example of a sidelink channel between UE 115-*b* and another UE 115. For example, these techniques may be applicable for sidelink communications, such as in a V2X system.

At 1115, UE 115-*b* may transmit CSI to base station 105-*b* based on training the first set of layers of the neural network. For example, UE 115-*b* may transmit a neural network-based CSI report to base station 105-*b*. The neural network-based CSI report may include at least the set of weights corresponding to the channel. Base station 105-*b* may be able to reconstruct the channel based on the set of weights and identify channel characteristics and interferences at UE 115-*b* on the channel.

At 1120, base station 105-*b* may transmit an NNCI to UE 115-*b*. The NNCI may indicate an association between a first set of one or more signals and a second set of one or more signals based on the set of trained layers of the neural network. For example, base station 105-*b* may transmit the NNCI to indicate that UE 115-*b* can reuse one or more trained layers or neural networks for the purpose of decoding, demodulating, estimating, or compressing another signal or channel. The NNCI may indicate the association between reference signals or channels, or an association between layers or neural networks and certain signals, processes, or channels. If UE 115-*b* is aware of the association, UE 115-*b* may avoid doing a cold-start when training a neural network or layer using the second set of one or more signals. UE 115-*b* may save processing power and latency by reusing a previously trained layer or neural network.

At 1125, base station 105-*b* may transmit the second set of one or more signals to UE 115-*b*. In some cases, base station 105-*b* may both transmit the NNCI and the second set of one or more signals. In some other examples, different devices or network entities may transmit the NNCI and the second set of one or more signals.

At 1130, UE 115-*b* may process the second set of one or more signals using the set of weights for the first set of layers based on the association between the first set of one or more signals and the second set of one or more signals.

In an example, the first set of one or more signals may be CSI-RS and the second set of one or more signals may be DMRS. UE 115-*b* may have trained one or more layers of a neural network on CSI-RS, and the NNCI may indicate that he one or more trained layers may be reused to process DMRS. UE 115-*b* may the receive DMRS and process the DMRS based on the one or more trained layers. For example, UE 115-*b* may demodulate the DMRS using a set of weights of neural network which was trained by CSI-RS. This may reduce an amount of time UE 115-*b* would spend demodulating the DMRS. Additionally, or alternatively, UE 115-*b* may train one or more layers of a neural network based on the DMRS. Be reusing some weights of the CSI-RS neural network, UE 115-*b* may increase a rate at which the DMRS neural network is trained.

FIG. 12 shows a block diagram 1200 of a device 1205 that supports neural network or layer configuration indicator for a CSI scheme in accordance with aspects of the present disclosure. The device 1205 may be an example of aspects of a UE 115 as described herein. The device 1205 may include a receiver 1210, a communication manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to neural network or layer configuration indicator for a CSI scheme, etc.). Information may be passed on to other components of the device 1205. The receiver 1210 may be an example of aspects of the transceiver 1515 described with reference to FIG. 15. The receiver 1210 may utilize a single antenna or a set of antennas.

The communication manager 1215 may train a first set of layers of a neural network based on channel estimates using a set of resources, generate a set of weights for the first set of layers of the neural network based on the training, receive, from a first network entity, an indication of an association between a first set of one or more signals and a second set of one or more signals based on the first set of layers of the neural network, receive the second set of one or more signals from a second network entity, and process the second set of one or more signals using the set of weights for the first set of layers based on the association between the first set of one or more signals and the second set of one or more signals. The communication manager 1215 may be an example of aspects of the communication manager 1510 described herein.

The communication manager 1215 may be an example of means for performing various aspects of a neural network or layer configuration indicator or a CSI scheme as described herein. The communication manager 1215, or its sub-components, may be implemented in hardware, code (e.g., software or firmware) executed by a processor, or any combination thereof. If implemented in code executed by a processor, the functions of the communication manager 1215, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In some examples, the communication manager 1215 may be configured to perform various operations (e.g., training, receiving, determining, transmitting, processing) using or otherwise in cooperation with the receiver 510, the transmitter 520, or both.

The communication manager 1215, or its sub-components, may be physically located at various positions, including being distributed such that portions of functions are implemented at different physical locations by one or more physical components. In some examples, the communication manager 1215, or its sub-components, may be a separate and distinct component in accordance with various aspects of the present disclosure. In some examples, the communication manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1515 described with reference to FIG. 15. The transmitter 1220 may utilize a single antenna or a set of antennas.

Figure 13:
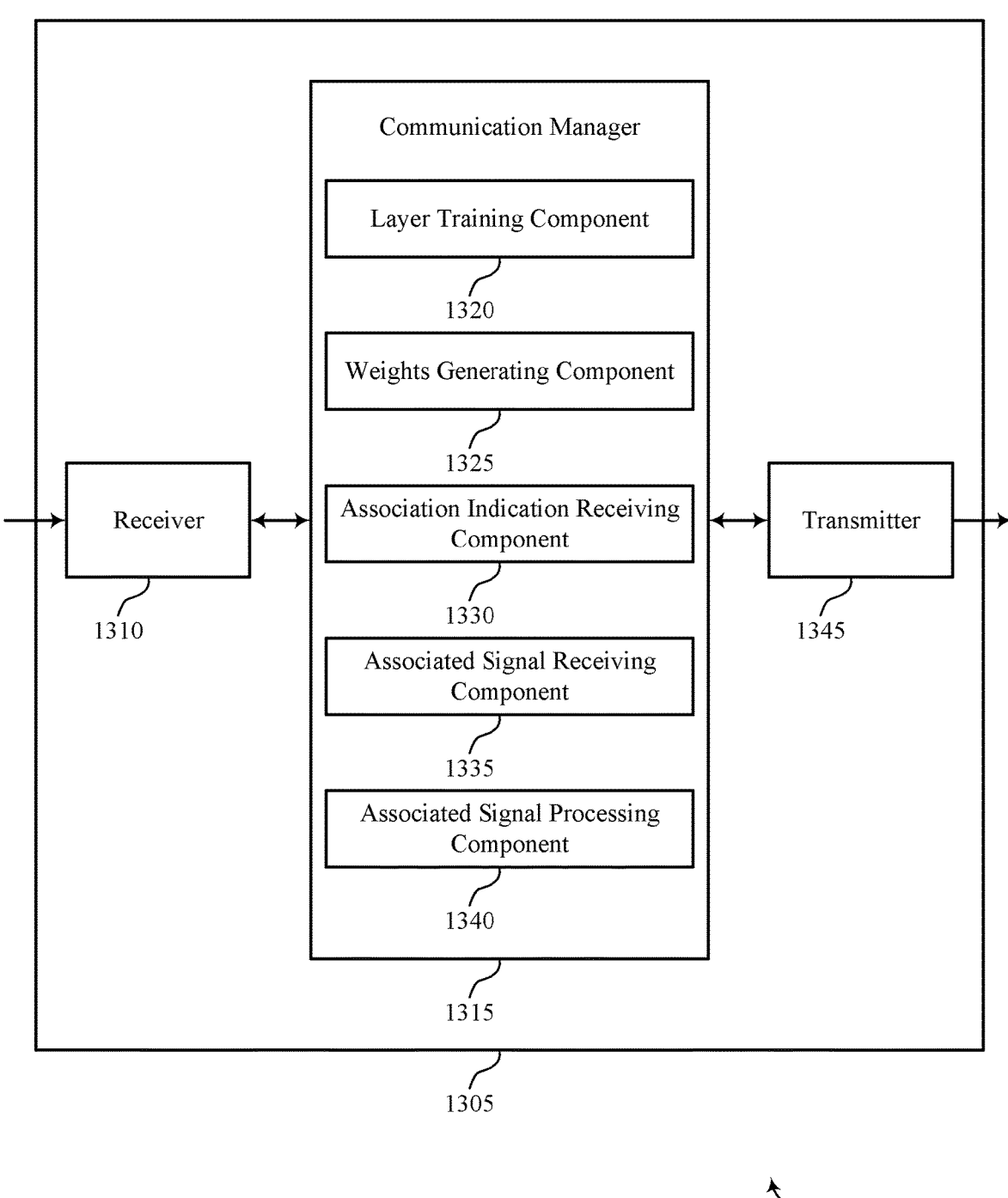

FIG. 13 shows a block diagram 1300 of a device 1305 that supports neural network or layer configuration indicator for a CSI scheme in accordance with aspects of the present disclosure. The device 1305 may be an example of aspects of a device 1205, or a UE 115 as described herein. The device 1305 may include a receiver 1310, a communication manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to neural network or layer configuration indicator for a CSI scheme, etc.). Information may be passed on to other components of the device 1305. The receiver 1310 may be an example of aspects of the transceiver 1515 described with reference to FIG. 15. The receiver 1310 may utilize a single antenna or a set of antennas.

The communication manager 1315 may be an example of aspects of the communication manager 1215 as described herein. The communication manager 1315 may include a layer training component 1320, a weights generating component 1325, an association indication receiving component 1330, an associated signal receiving component 1335, and an associated signal processing component 1340. The communication manager 1315 may be an example of aspects of the communication manager 1510 described herein.

The associated signal receiving component 1335 may receive the second set of one or more signals from a second network entity. The layer training component 1320 may train a first set of layers of a neural network based on channel estimates using a set of resources. The associated signal processing component 1340 may process the second set of one or more signals using the set of weights for the first set of layers based on the association between the first set of one or more signals and the second set of one or more signals. The weights generating component 1325 may generate a set of weights for the first set of layers of the neural network based on the training. The association indication receiving component 1330 may receive, from a first network entity, an indication of an association between a first set of one or more signals and a second set of one or more signals based on the first set of layers of the neural network.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1515 described with reference to FIG. 15. The transmitter 1345 may utilize a single antenna or a set of antennas.

Figure 14:
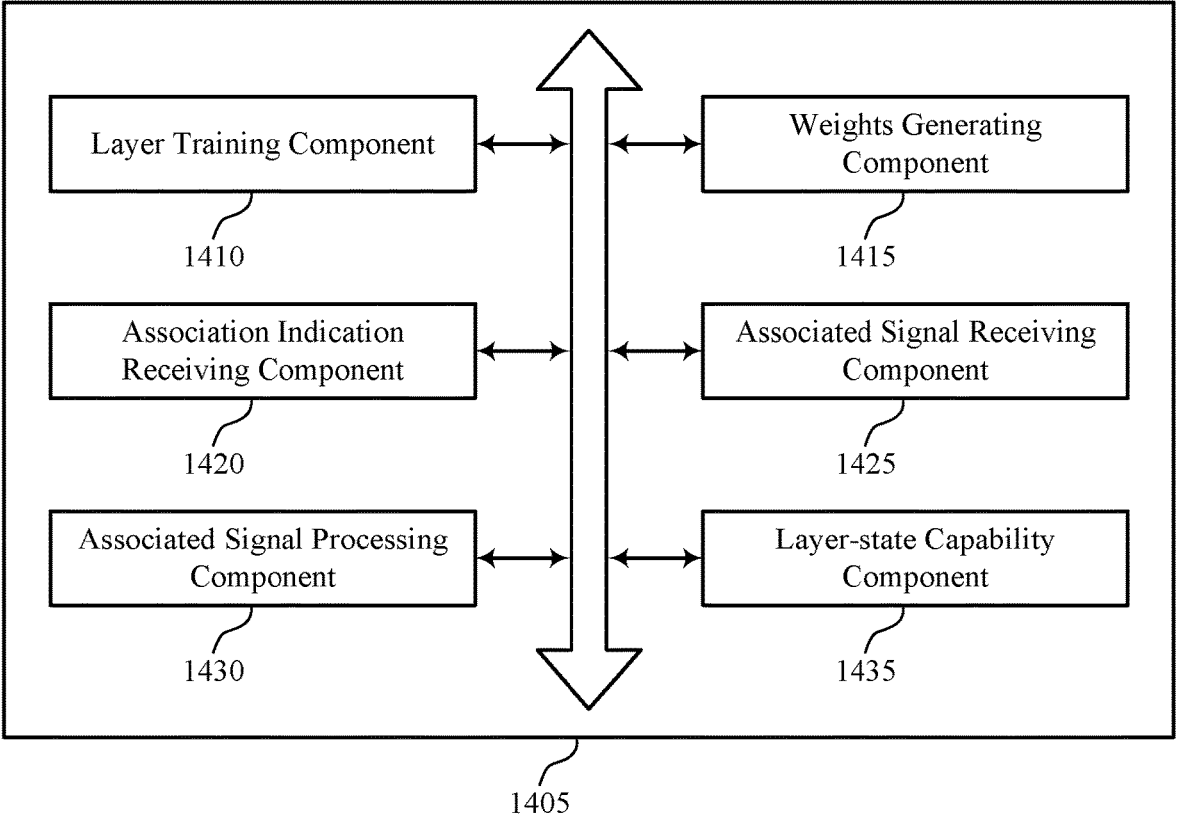
FIG. 14 shows a block diagram of a communication manager that supports neural network or layer configuration indicator for a CSI scheme in accordance with aspects of the present disclosure.

FIG. 14 shows a block diagram 1400 of a communication manager 1405 that supports neural network or layer configuration indicator for a CSI scheme in accordance with aspects of the present disclosure. The communication manager 1405 may be an example of aspects of a communication manager 1215, a communication manager 1315, or a communication manager 1510 described herein. The communication manager 1405 may include a layer training component 1410, a weights generating component 1415, an association indication receiving component 1420, an associated signal receiving component 1425, an associated signal processing component 1430, and a layer-state capability component 1435. Each of these modules may communicate, directly or indirectly, with one another (e.g., via one or more buses).

The layer training component 1410 may train a first set of layers of a neural network based on channel estimates using a set of resources. In some cases, the first set of one or more signals includes one or more of a CSI-RS, an SSB, a PRS, a DMRS, a tracking signal, a data channel, or a control channel. In some cases, the first set of layers of the neural network includes one or more residual neural network layers or one or more convolutional neural network layers, or any combination thereof.

The weights generating component 1415 may generate a set of weights for the first set of layers of the neural network based on the training. The association indication receiving component 1420 may receive, from a first network entity, an indication of an association between a first set of one or more signals and a second set of one or more signals based on the first set of layers of the neural network. In some cases, the indication of the association includes a source identifier and a target identifier. In some cases, the source identifier includes an identifier of the neural network. In some cases, the target identifier includes an identifier of the second set of one or more signals, a procedure for the second set of one or more signals, or an identifier of a second neural network, or any combination.

In some cases, the source identifier includes an identifier of a signal or procedure corresponding to at least the first set of one or more signals. In some cases, the source identifier includes an identifier of at least the first set of layers of the neural network.

In some cases, the indication of the association is received via higher-layer signals, a MAC CE, downlink control information, or both. In some cases, the second network entity is another UE, a base station, a transmission and reception point, a server, the first network entity or any combination thereof.

The associated signal receiving component 1425 may receive the second set of one or more signals from a second network entity. In some cases, the second set of one or more signals includes one or more of a CSI-RS, an SSB, a PRS, a DMRS, a tracking signal, a data channel, or a control channel.

In some cases, the first set of one or more signals corresponds to a first component carrier and the second set of one or more signals corresponds to a second component carrier. In some cases, the first set of one or more signals corresponds to a first band and the second set of one or more signals corresponds to a second band. In some cases, the first set of one or more signals corresponds to a first band combination and the second set of one or more signals corresponds to a second band combination. In some cases, the first set of one or more signals corresponds to a first frequency range and the second set of one or more signals corresponds to a second frequency range.

The associated signal processing component 1430 may process the second set of one or more signals using the set of weights for the first set of layers based on the association between the first set of one or more signals and the second set of one or more signals. In some examples, the associated signal processing component 1430 may decode the second set of one or more signals using the set of weights for the first set of layers based on the association between the first set of one or more signals and the second set of one or more signals. In some examples, the associated signal processing component 1430 may demodulate the second set of one or more signals using the set of weights for the first set of layers based on the association between the first set of one or more signals and the second set of one or more signals.

In some examples, the associated signal processing component 1430 may estimate the channel from the second set of one or more signals using the set of weights for the first set of layers based on the association between the first set of one or more signals and the second set of one or more signals. In some examples, the associated signal processing component 1430 may compress the second set of one or more signals using the set of weights for the first set of layers based on the association between the first set of one or more signals and the second set of one or more signals. In some examples, the associated signal processing component 1430 may train the first set of layers of the neural network, a second set of layers of the neural network, or both, based on compressing the second set of one or more signals. In some examples, the associated signal processing component 1430 may train a set of layers of a second neural network using the set of weights for the first set of layers of the neural network based on the association between the first set of one or more signals and the second set of one or more signals.

In some examples, the associated signal processing component 1430 may receive a third set of one or more signals from the second network entity. In some examples, the associated signal processing component 1430 may process the third set of one or more signals using the set of weights.

The layer-state capability component 1435 may transmit, to the first network entity, an indication of a quantity of layer-states that the UE is capable of storing, tracking, training, processing, or any combination thereof, for one or more of a component carrier, a band, a band combination.

Figure 15:
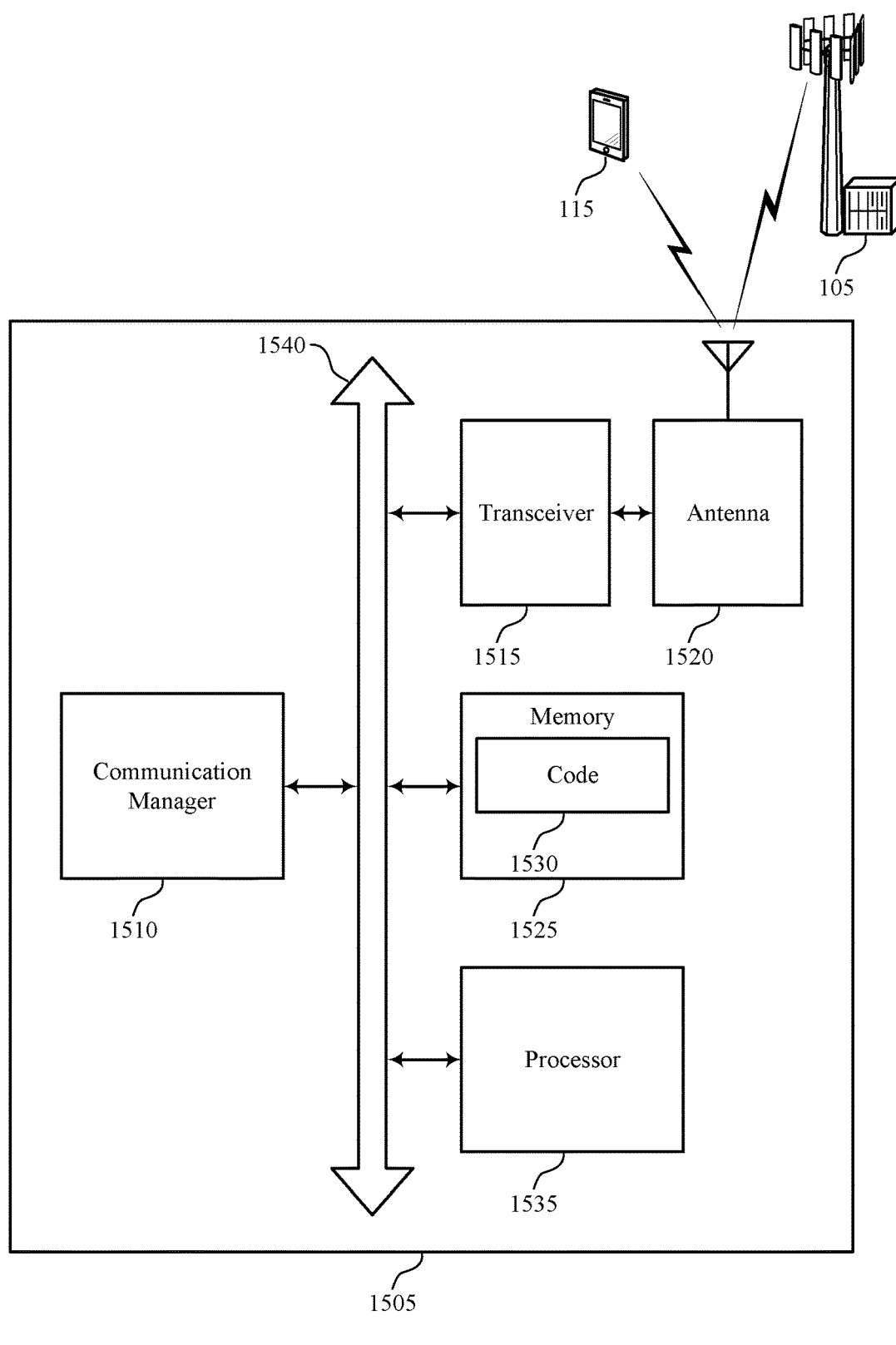
FIG. 15 shows a diagram of a system including a device that supports neural network or layer configuration indicator for a CSI scheme in accordance with aspects of the present disclosure.

FIG. 15 shows a diagram of a system 1500 including a device 1505 that supports neural network or layer configuration indicator for a CSI scheme in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communication manager 1510, a transceiver 1515, an antenna 1520, memory 1525, and a processor 1535. These components may be in electronic communication via one or more buses (e.g., bus 1540).

The communication manager 1510 may train a first set of layers of a neural network based on channel estimates using a set of resources, generate a set of weights for the first set of layers of the neural network based on the training, receive, from a first network entity, an indication of an association between a first set of one or more signals and a second set of one or more signals based on the first set of layers of the neural network, receive the second set of one or more signals from a second network entity, and process the second set of one or more signals using the set of weights for the first set of layers based on the association between the first set of one or more signals and the second set of one or more signals.

The transceiver 1515 may communicate bi-directionally, via one or more antennas, wired, or wireless links as described above. For example, the transceiver 1515 may represent a wireless transceiver and may communicate bi-directionally with another wireless transceiver. The transceiver 1515 may also include a modem to modulate the packets and provide the modulated packets to the antennas for transmission, and to demodulate packets received from the antennas.

In some cases, the wireless device may include a single antenna 1520. However, in some cases the device may have more than one antenna 1520, which may be capable of concurrently transmitting or receiving multiple wireless transmissions.

The memory 1525 may include random-access memory (RAM) and read-only memory (ROM). The memory 1525 may store computer-readable, computer-executable code 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

The code 1530 may include instructions to implement aspects of the present disclosure, including instructions to support wireless communications. The code 1530 may be stored in a non-transitory computer-readable medium such as system memory or other type of memory. In some cases, the code 1530 may not be directly executable by the processor 1535 but may cause a computer (e.g., when compiled and executed) to perform functions described herein.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting neural network or layer configuration indicator for a CSI scheme).

Figure 16:
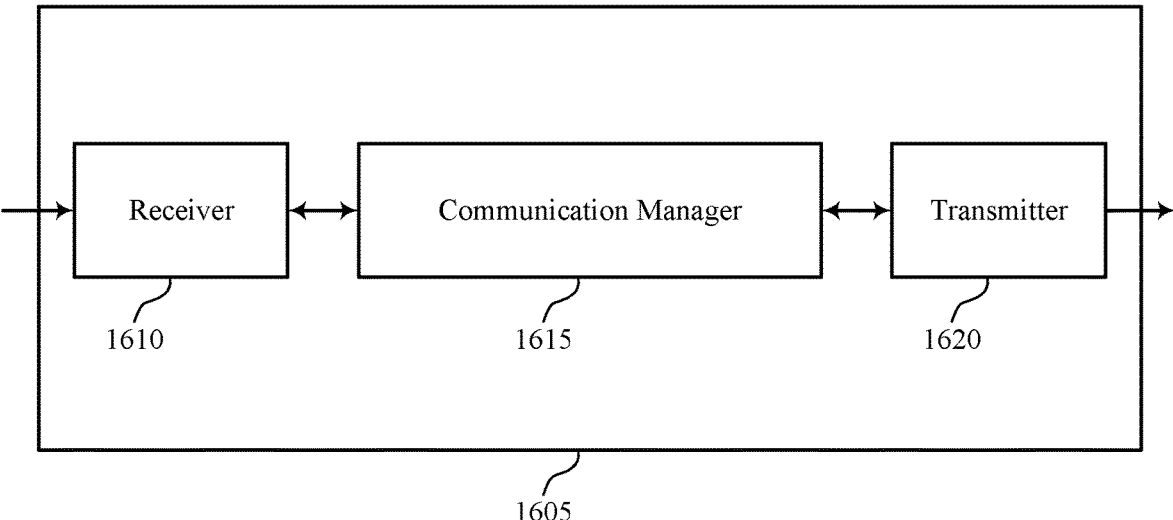
FIGS. 16 and 17 show block diagrams of devices that support neural network or layer configuration indicator for a CSI scheme in accordance with aspects of the present disclosure.

FIG. 16 shows a block diagram 1600 of a device 1605 that supports neural network or layer configuration indicator for a CSI scheme in accordance with aspects of the present disclosure. The device 1605 may be an example of aspects of a base station 105 as described herein. The device 1605 may include a receiver 1610, a communication manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to neural network or layer configuration indicator for a CSI scheme, etc.). Information may be passed on to other components of the device 1605. The receiver 1610 may be an example of aspects of the transceiver 1920 described with reference to FIG. 19. The receiver 1610 may utilize a single antenna or a set of antennas.

The communication manager 1615 may receive, from a UE an indication of a set of trained layers of a neural network based on channel estimates over a set of resources, identify a set of weights for the set of trained layers of the neural network based on the indication of the set of trained layers, transmit the second set of one or more signals to the UE, and transmit, to the UE, an indication of an association between a first set of one or more signals and a second set of one or more signals based on the set of trained layers of the neural network. The communication manager 1615 may be an example of aspects of the communication manager 1910 described herein.

The communication manager 1615 may be an example of means for performing various aspects of a neural network or layer configuration indicator for a CSI scheme as described herein. The communication manager 1615, or its sub-components, may be implemented in hardware, code (e.g., software or firmware) executed by a processor, or any combination thereof. If implemented in code executed by a processor, the functions of the communication manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communication manager 1615, or its sub-components, may be implemented in hardware, code (e.g., software or firmware) executed by a processor, or any combination thereof. If implemented in code executed by a processor, the functions of the communication manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communication manager 1615, or its sub-components, may be physically located at various positions, including being distributed such that portions of functions are implemented at different physical locations by one or more physical components. In some examples, the communication manager 1615, or its sub-components, may be a separate and distinct component in accordance with various aspects of the present disclosure. In some examples, the communication manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communication manager 1615 may be configured to perform various operations (e.g., receiving, identifying, determining, transmitting) using or otherwise in cooperation with the receiver 510, the transmitter 520, or both.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
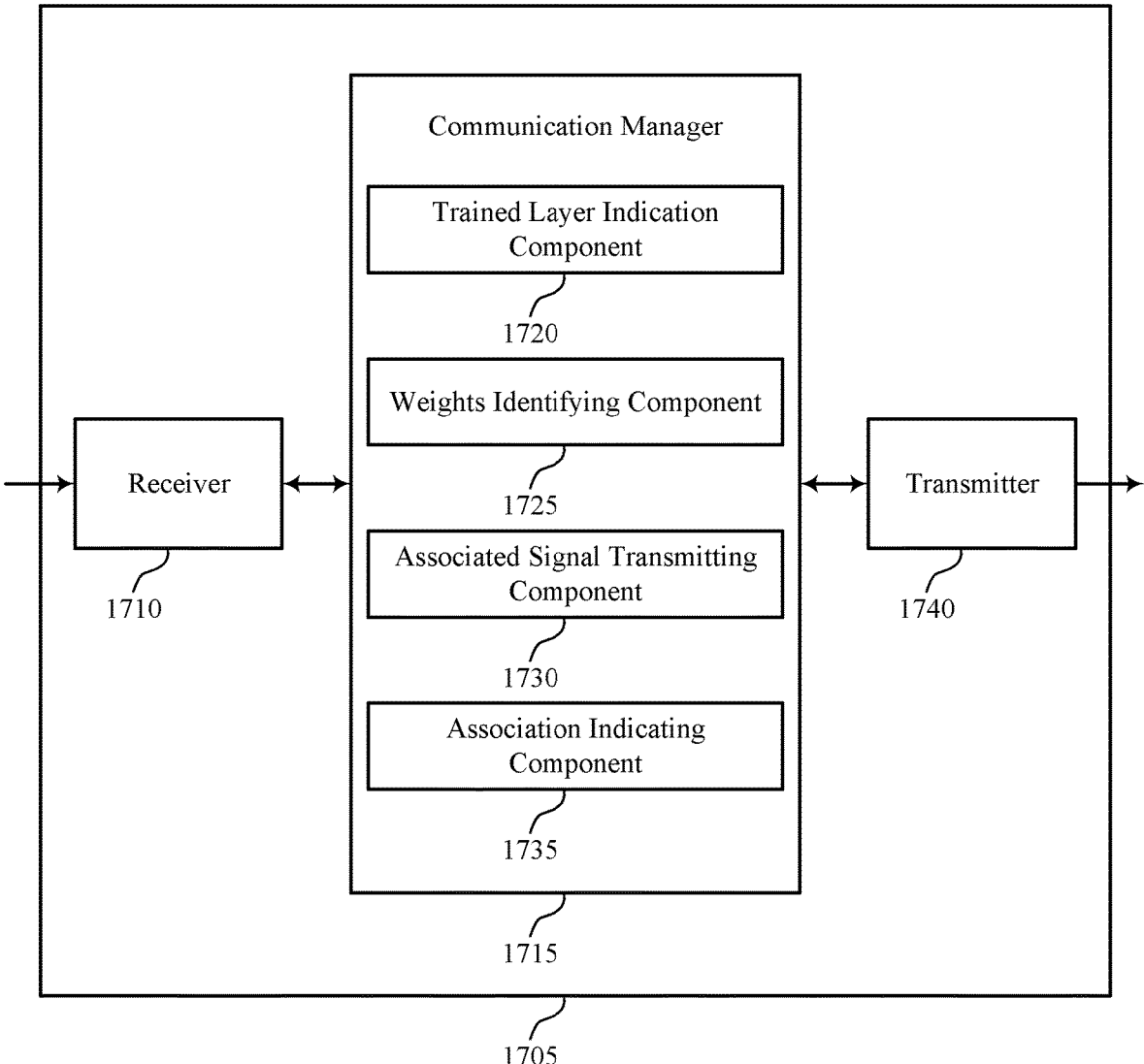

FIG. 17 shows a block diagram 1700 of a device 1705 that supports neural network or layer configuration indicator for a CSI scheme in accordance with aspects of the present disclosure. The device 1705 may be an example of aspects of a device 1605, or a base station 105 as described herein. The device 1705 may include a receiver 1710, a communication manager 1715, and a transmitter 1740. The device 1705 may also include a processor. Each of these components may be in communication with one another (e.g., via one or more buses).

The receiver 1710 may receive information such as packets, user data, or control information associated with various information channels (e.g., control channels, data channels, and information related to neural network or layer configuration indicator for a CSI scheme, etc.). Information may be passed on to other components of the device 1705. The receiver 1710 may be an example of aspects of the transceiver 1920 described with reference to FIG. 19. The receiver 1710 may utilize a single antenna or a set of antennas.

The communication manager 1715 may be an example of aspects of the communication manager 1615 as described herein. The communication manager 1715 may include a trained layer indication component 1720, a weights identifying component 1725, an associated signal transmitting component 1730, and an association indicating component 1735. The communication manager 1715 may be an example of aspects of the communication manager 1910 described herein.

The trained layer indication component 1720 may receive, from a UE an indication of a set of trained layers of a neural network based on channel estimates over a set of resources. The weights identifying component 1725 may identify a set of weights for the set of trained layers of the neural network based on the indication of the set of trained layers. The associated signal transmitting component 1730 may transmit the second set of one or more signals to the UE. The association indicating component 1735 may transmit, to the UE, an indication of an association between a first set of one or more signals and a second set of one or more signals based on the set of trained layers of the neural network.

The transmitter 1740 may transmit signals generated by other components of the device 1705. In some examples, the transmitter 1740 may be collocated with a receiver 1710 in a transceiver module. For example, the transmitter 1740 may be an example of aspects of the transceiver 1920 described with reference to FIG. 19. The transmitter 1740 may utilize a single antenna or a set of antennas.

Figure 18:
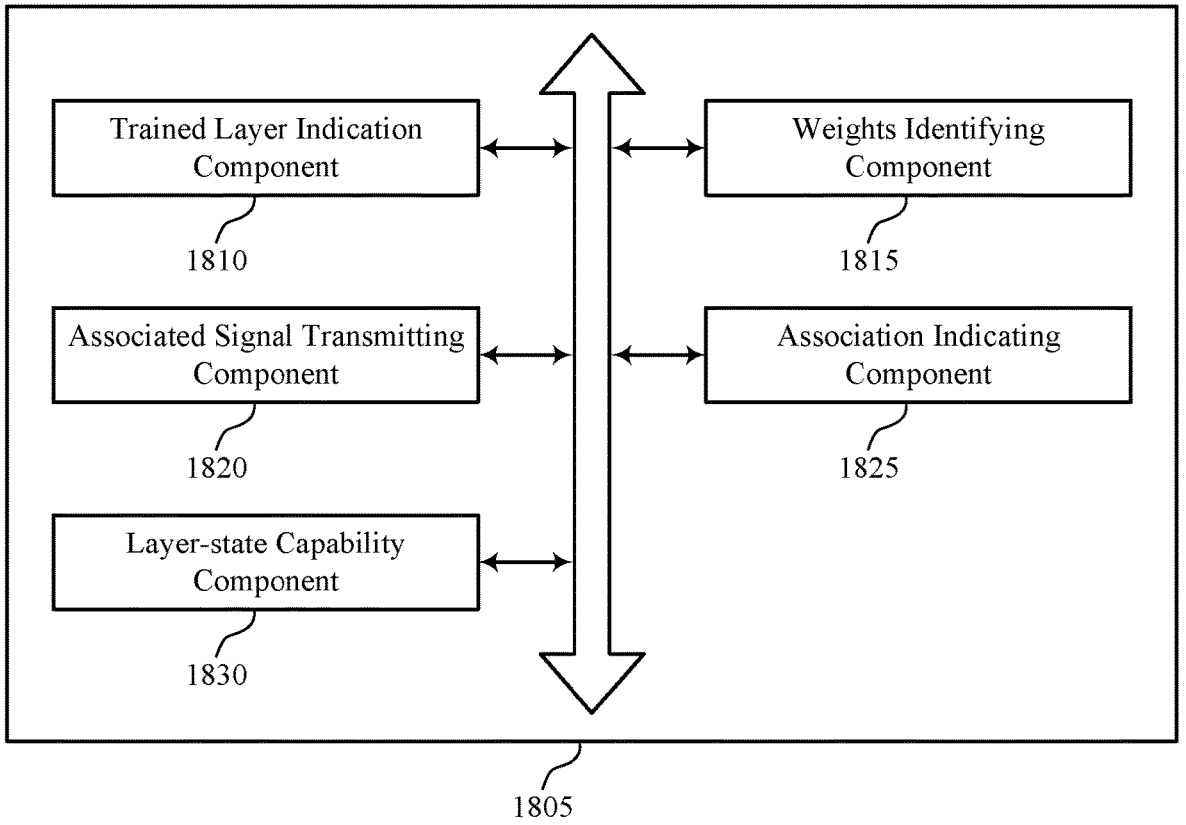
FIG. 18 shows a block diagram of a communication manager that supports neural network or layer configuration indicator for a CSI scheme in accordance with aspects of the present disclosure.

FIG. 18 shows a block diagram 1800 of a communication manager 1805 that supports neural network or layer configuration indicator for a CSI scheme in accordance with aspects of the present disclosure. The communication manager 1805 may be an example of aspects of a communication manager 1615, a communication manager 1715, or a communication manager 1910 described herein. The communication manager 1805 may include a trained layer indication component 1810, a weights identifying component 1815, an associated signal transmitting component 1820, an association indicating component 1825, and a layer-state capability component 1830. Each of these modules may communicate, directly or indirectly, with one another (e.g., via one or more buses).

The trained layer indication component 1810 may receive, from a UE an indication of a set of trained layers of a neural network based on channel estimates over a set of resources. In some cases, the first set of one or more signals includes one or more of a CSI-RS, an SSB, or a PRS.

The weights identifying component 1815 may identify a set of weights for the set of trained layers of the neural network based on the indication of the set of trained layers. The associated signal transmitting component 1820 may transmit the second set of one or more signals to the UE. In some cases, the second set of one or more signals includes one or more of a CSI-RS, an SSB, or a PRS.

The association indicating component 1825 may transmit, to the UE, an indication of an association between a first set of one or more signals and a second set of one or more signals based on the set of trained layers of the neural network. In some examples, the association indicating component 1825 may transmit the indication of the association via a MAC CE, downlink control information, or both. In some cases, the indication of the association includes a source identifier and a target identifier.

In some cases, the source identifier includes an identifier of the neural network. In some cases, the source identifier includes an identifier of at least the set of trained layers of the neural network. In some cases, the source identifier includes an identifier of a signal or procedure corresponding to at least the first set of one or more signals. In some cases, the target identifier includes an identifier of the second set of one or more signals, a procedure for the second set of one or more signals, or both.

In some cases, the first set of one or more signals corresponds to a first component carrier and the second set of one or more signals corresponds to a second component carrier. In some cases, the first set of one or more signals corresponds to a first band and the second set of one or more signals corresponds to a second band. In some cases, the first set of one or more signals corresponds to a first frequency range and the second set of one or more signals corresponds to a second frequency range. In some cases, the set of trained layers of the neural network includes one or more residual neural network layers or one or more convolutional neural network layers, or any combination thereof.

The layer-state capability component 1830 may receive, from the UE, an indication of a quantity of layer-states that the UE is capable of storing, tracking, training, processing, or any combination thereof, for one or more of a component carrier, a band, a band combination.

Figure 19:
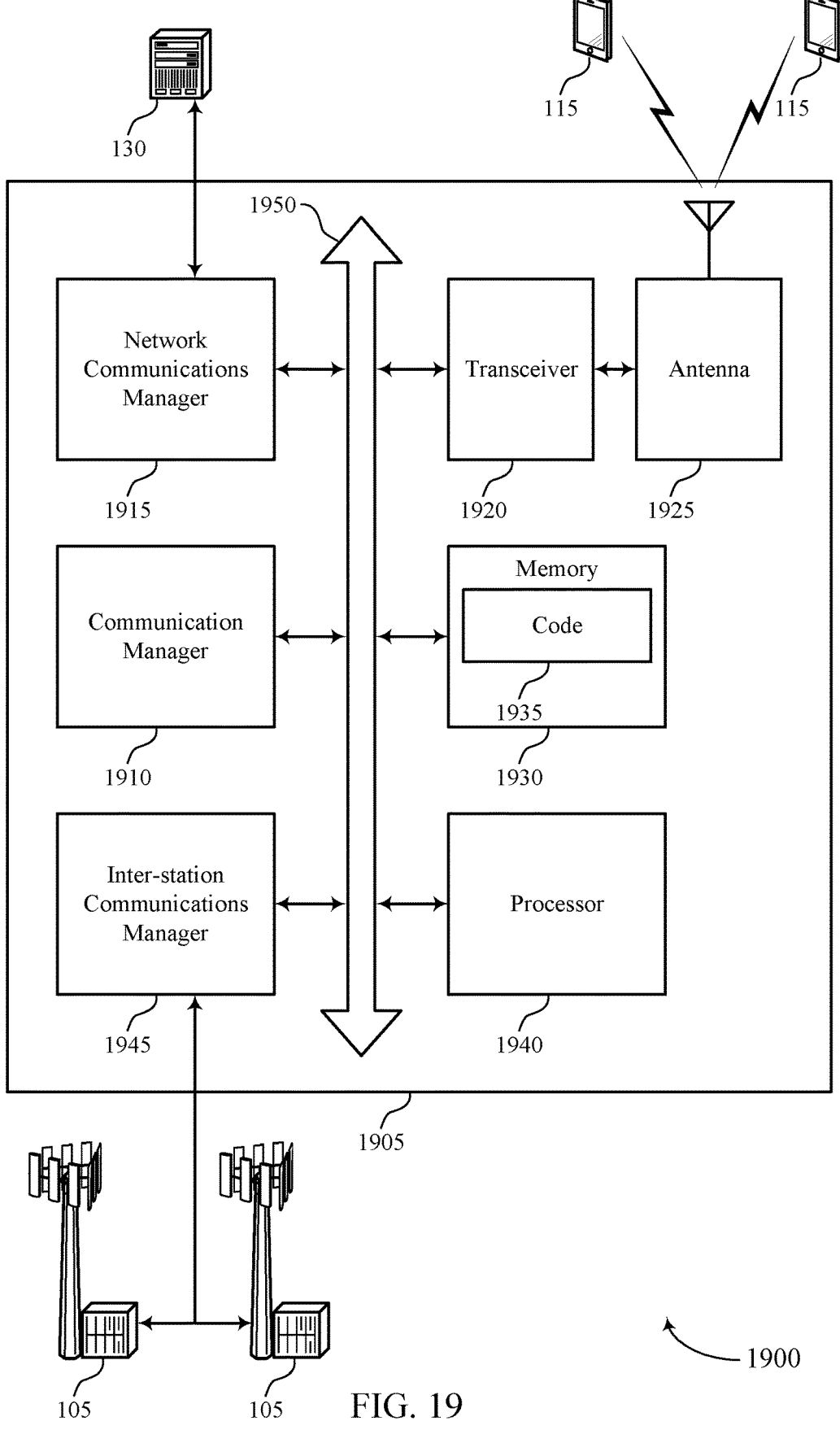
FIG. 19 shows a diagram of a system including a device that supports neural network or layer configuration indicator for a CSI scheme in accordance with aspects of the present disclosure.

FIG. 19 shows a diagram of a system 1900 including a device 1905 that supports neural network or layer configuration indicator for a CSI scheme in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communication manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communication manager 1910 may receive, from a UE an indication of a set of trained layers of a neural network based on channel estimates over a set of resources, identify a set of weights for the set of trained layers of the neural network based on the indication of the set of trained layers, transmit the second set of one or more signals to the UE, and transmit, to the UE, an indication of an association between a first set of one or more signals and a second set of one or more signals based on the set of trained layers of the neural network.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable code 1935 including instructions that, when executed, cause the processor to perform various functions described herein. In some cases, the memory 1930 may contain, among other things, a BIOS which may control basic hardware or software operation such as the interaction with peripheral components or devices.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting neural network or layer configuration indicator for a CSI scheme).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

Figure 20:
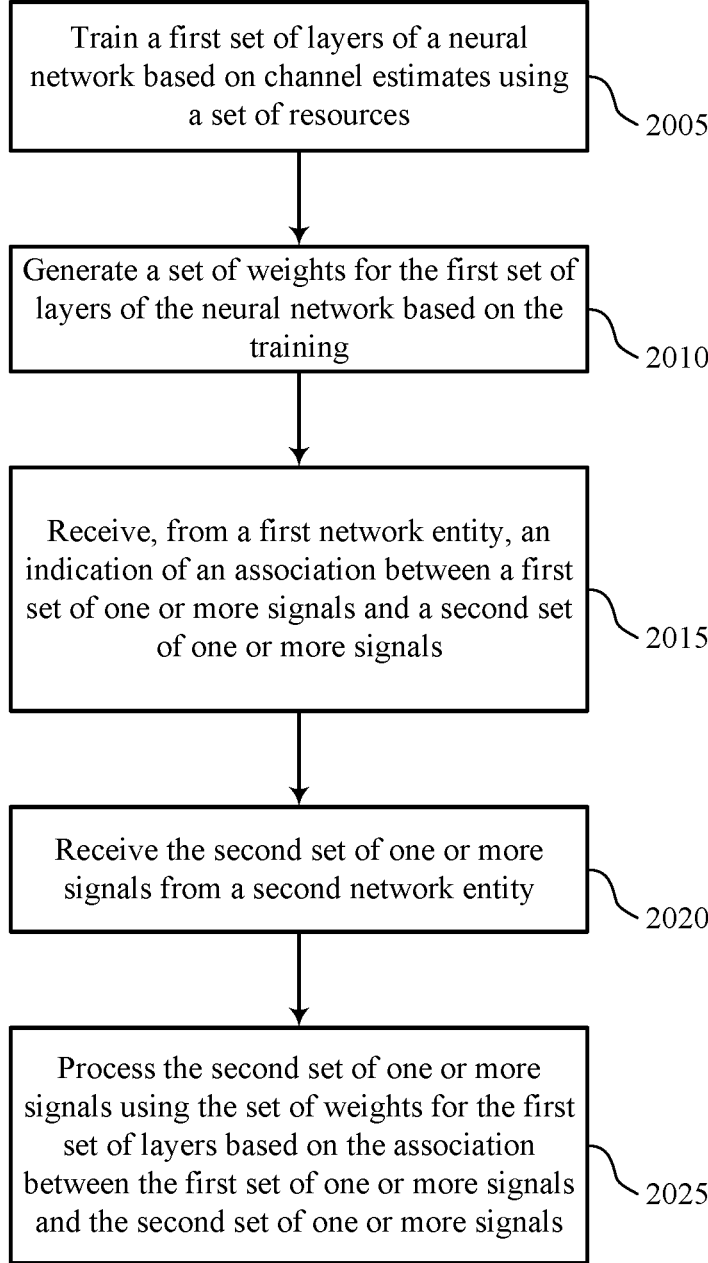

FIG. 20 shows a flowchart illustrating a method 2000 that supports neural network or layer configuration indicator for a CSI scheme in accordance with aspects of the present disclosure. The operations of method 2000 may be implemented by a UE 115 or its components as described herein. For example, the operations of method 2000 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2005, the UE may train a first set of layers of a neural network based on channel estimates using a set of resources. The operations of 2005 may be performed according to the methods described herein. In some examples, aspects of the operations of 2005 may be performed by a layer training component as described with reference to FIGS. 12 through 15.

At 2010, the UE may generate a set of weights for the first set of layers of the neural network based on the training. The operations of 2010 may be performed according to the methods described herein. In some examples, aspects of the operations of 2010 may be performed by a weights generating component as described with reference to FIGS. 12 through 15.

At 2015, the UE may receive, from a first network entity, an indication of an association between a first set of one or more signals and a second set of one or more signals. The operations of 2015 may be performed according to the methods described herein. In some examples, aspects of the operations of 2015 may be performed by an association indication receiving component as described with reference to FIGS. 12 through 15.

At 2020, the UE may receive the second set of one or more signals from a second network entity. The operations of 2020 may be performed according to the methods described herein. In some examples, aspects of the operations of 2020 may be performed by an associated signal receiving component as described with reference to FIGS. 12 through 15.

At 2025, the UE may process the second set of one or more signals using the set of weights for the first set of layers based on the association between the first set of one or more signals and the second set of one or more signals. The operations of 2025 may be performed according to the methods described herein. In some examples, aspects of the operations of 2025 may be performed by an associated signal processing component as described with reference to FIGS. 12 through 15.

FIG. 21 shows a flowchart illustrating a method 2100 that supports neural network or layer configuration indicator for a CSI scheme in accordance with aspects of the present disclosure. The operations of method 2100 may be implemented by a UE 115 or its components as described herein. For example, the operations of method 2100 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2105, the UE may transmit, to the base station, an indication of a quantity of layer-states that the UE is capable of storing, tracking, training, processing, or any combination thereof, for one or more of a component carrier, a band, a band combination. The operations of 2105 may be performed according to the methods described herein. In some examples, aspects of the operations of 2105 may be performed by a layer-state capability component as described with reference to FIGS. 12 through 15.

At 2110, the UE may train a first set of layers of a neural network based on channel estimates using a set of resources. The operations of 2110 may be performed according to the methods described herein. In some examples, aspects of the operations of 2110 may be performed by a layer training component as described with reference to FIGS. 12 through 15.

At 2115, the UE may generate a set of weights for the first set of layers of the neural network based on the training. The operations of 2115 may be performed according to the methods described herein. In some examples, aspects of the operations of 2115 may be performed by a weights generating component as described with reference to FIGS. 12 through 15.

At 2120, the UE may receive, from a first network entity, an indication of an association between a first set of one or more signals and a second set of one or more signals based on the first set of layers of the neural network. The operations of 2120 may be performed according to the methods described herein. In some examples, aspects of the operations of 2120 may be performed by an association indication receiving component as described with reference to FIGS. 12 through 15.

At 2125, the UE may receive the second set of one or more signals from a second network entity. The operations of 2125 may be performed according to the methods described herein. In some examples, aspects of the operations of 2125 may be performed by an associated signal receiving component as described with reference to FIGS. 12 through 15.

At 2130, the UE may process the second set of one or more signals using the set of weights for the first set of layers based on the association between the first set of one or more signals and the second set of one or more signals. The operations of 2130 may be performed according to the methods described herein. In some examples, aspects of the operations of 2130 may be performed by an associated signal processing component as described with reference to FIGS. 12 through 15.

FIG. 22 shows a flowchart illustrating a method 2200 that supports neural network or layer configuration indicator for a CSI scheme in accordance with aspects of the present disclosure. The operations of method 2200 may be implemented by a base station 105 or its components as described herein. For example, the operations of method 2200 may be performed by a communication manager as described with reference to FIGS. 16 through 19. In some examples, a base station may execute a set of instructions to control the functional elements of the base station to perform the described functions. Additionally or alternatively, a base station may perform aspects of the described functions using special-purpose hardware.

At 2205, the base station may receive, from a UE an indication of a set of trained layers of a neural network based on channel estimates over a set of resources. The operations of 2205 may be performed according to the methods described herein. In some examples, aspects of the operations of 2205 may be performed by a trained layer indication component as described with reference to FIGS. 16 through 19.

At 2210, the base station may identify a set of weights for the set of trained layers of the neural network based on the indication of the set of trained layers. The operations of 2210 may be performed according to the methods described herein. In some examples, aspects of the operations of 2210 may be performed by a weights identifying component as described with reference to FIGS. 16 through 19.

At 2215, the base station may transmit, to the UE, an indication of an association between a first set of one or more signals and a second set of one or more signals based on the set of trained layers of the neural network. The operations of 2215 may be performed according to the methods described herein. In some examples, aspects of the operations of 2215 may be performed by an association indicating component as described with reference to FIGS. 16 through 19.

At 2220, the base station may transmit the second set of one or more signals to the UE. The operations of 2220 may be performed according to the methods described herein. In some examples, aspects of the operations of 2220 may be performed by an associated signal transmitting component as described with reference to FIGS. 16 through 19.

FIG. 23 shows a flowchart illustrating a method 2300 that supports neural network or layer configuration indicator for a CSI scheme in accordance with aspects of the present disclosure. The operations of method 2300 may be implemented by a base station 105 or its components as described herein. For example, the operations of method 2300 may be performed by a communication manager as described with reference to FIGS. 16 through 19. In some examples, a base station may execute a set of instructions to control the functional elements of the base station to perform the described functions. Additionally or alternatively, a base station may perform aspects of the described functions using special-purpose hardware.

At 2305, the base station may receive, from the UE, an indication of a quantity of layer-states that the UE is capable of storing, tracking, training, processing, or any combination thereof, for one or more of a component carrier, a band, a band combination. The operations of 2305 may be performed according to the methods described herein. In some examples, aspects of the operations of 2305 may be performed by a layer-state capability component as described with reference to FIGS. 16 through 19.

At 2310, the base station may receive, from a UE an indication of a set of trained layers of a neural network based on channel estimates over a set of resources. The operations of 2310 may be performed according to the methods described herein. In some examples, aspects of the operations of 2310 may be performed by a trained layer indication component as described with reference to FIGS. 16 through 19.

At 2315, the base station may identify a set of weights for the set of trained layers of the neural network based on the indication of the set of trained layers. The operations of 2315 may be performed according to the methods described herein. In some examples, aspects of the operations of 2315 may be performed by a weights identifying component as described with reference to FIGS. 16 through 19.

At 2320, the base station may transmit, to the UE, an indication of an association between a first set of one or more signals and a second set of one or more signals based on the set of trained layers of the neural network. The operations of 2320 may be performed according to the methods described herein. In some examples, aspects of the operations of 2320 may be performed by an association indicating component as described with reference to FIGS. 16 through 19.

At 2325, the base station may transmit the second set of one or more signals to the UE. The operations of 2325 may be performed according to the methods described herein. In some examples, aspects of the operations of 2325 may be performed by an associated signal transmitting component as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Example 1: A method for wireless communications at a UE, comprising: training a first set of layers of a neural network based at least in part on channel estimates using a set of resources; generating a set of weights for the first set of layers of the neural network based at least in part on the training; receiving, from a first network entity, an indication of an association between a first set of one or more signals and a second set of one or more signals; receiving the second set of one or more signals from a second network entity; and processing the second set of one or more signals using the set of weights for the first set of layers based at least in part on the association between the first set of one or more signals and the second set of one or more signals.

Example 2: The method of example 1, further comprising: transmitting, to the base station, an indication of a quantity of layer-states that the UE is capable of storing, tracking, training, processing, or any combination thereof, for one or more of a component carrier, a band, a band combination.

Example 3: The method of example 1 or 2, wherein processing the second set of one or more signals comprises: decoding the second set of one or more signals using the set of weights for the first set of layers based at least in part on the association between the first set of one or more signals and the second set of one or more signals.

Example 4: The method of any of examples 1 through 3, wherein processing the second set of one or more signals comprises: demodulating the second set of one or more signals using the set of weights for the first set of layers based at least in part on the association between the first set of one or more signals and the second set of one or more signals.

Example 5: The method of any of examples 1 through 4, wherein processing the second set of one or more signals comprises: estimating the channel from the second set of one or more signals using the set of weights for the first set of layers based at least in part on the association between the first set of one or more signals and the second set of one or more signals.

Example 6: The method of any of examples 1 through 5, wherein processing the second set of one or more signals comprises: compressing the second set of one or more signals using the set of weights for the first set of layers based at least in part on the association between the first set of one or more signals and the second set of one or more signals; and training the first set of layers of the neural network, a second set of layers of the neural network, or both, based at least in part on compressing the second set of one or more signals.

Example 7: The method of any of examples 1 through 6, wherein processing the second set of one or more signals comprises: training a set of layers of a second neural network using the set of weights for the first set of layers of the neural network based at least in part on the association between the first set of one or more signals and the second set of one or more signals.

Example 8: The method of any of examples 1 through 7, wherein the first set of one or more signals comprises one or more of a channel state information reference signal, a synchronization signal block, or a positioning reference signal, a demodulation reference signal, a tracking signal, a data channel, or a control channel.

Example 9: The method of any of examples 1 through 8, wherein the second set of one or more signals comprises one or more of a channel state information reference signal, a synchronization signal block, or a positioning reference signal, a demodulation reference signal, a tracking signal, a data channel, or a control channel.

Example 10: The method of any of examples 1 through 9, wherein the indication of the association comprises a source identifier and a target identifier.

Example 11: The method of any of examples 1 through 10, wherein the source identifier includes an identifier of the neural network.

Example 12: The method of any of examples 1 through 10, wherein the target identifier includes an identifier of the second set of one or more signals, a procedure for the second set of one or more signals, or an identifier of a second neural network, or any combination.

Example 13: The method of any of examples 1 through 10, wherein the source identifier includes an identifier of a signal or procedure corresponding to at least the first set of one or more signals.

Example 14: The method of any of examples 1 through 13, wherein the source identifier includes an identifier of at least the first set of layers of the neural network.

Example 15: The method of any of examples 1 through 14, wherein the indication of the association is received via higher-layer signals, a MAC CE, downlink control information, or both.

Example 16: The method of any of examples 1 through 15, wherein the first set of one or more signals corresponds to a first component carrier and the second set of one or more signals corresponds to a second component carrier.

Example 17: The method of any of examples 1 through 16, wherein the first set of one or more signals corresponds to a first band and the second set of one or more signals corresponds to a second band.

Example 18: The method of any of examples 1 through 17, wherein the first set of one or more signals corresponds to a first band combination and the second set of one or more signals corresponds to a second band combination.

Example 19: The method of any of examples 1 through 18, wherein the first set of one or more signals corresponds to a first frequency range and the second set of one or more signals corresponds to a second frequency range.

Example 20: The method of any of examples 1 through 19, wherein the first set of layers of the neural network comprises one or more residual neural network layers or one or more convolutional neural network layers, or any combination thereof.

Example 21: The method of any of examples 1 through 20, further comprising: receiving a third set of one or more signals from the second network entity; and processing the third set of one or more signals using the set of weights.

Example 22: The method of any of examples 1 through 21, wherein the second network entity is another UE, a base station, a transmission and reception point, a server, the first network entity or any combination thereof.

Example 23: A method for wireless communications at a network entity comprising: receiving, from a user equipment (UE) an indication of a set of trained layers of a neural network based at least in part on channel estimates over a set of resources; identifying a set of weights for the set of trained layers of the neural network based at least in part on the indication of the set of trained layers; transmitting, to the UE, an indication of an association between a first set of one or more signals and a second set of one or more signals based at least in part on the set of trained layers of the neural network; and transmitting the second set of one or more signals to the UE.

Example 24: The method of example 23, further comprising: receiving, from the UE, an indication of a quantity of layer-states that the UE is capable of storing, tracking, training, processing, or any combination thereof, for one or more of a component carrier, a band, a band combination.

Example 25: The method of examples 23 or 24, wherein the first set of one or more signals comprises one or more of a channel state information reference signal, a synchronization signal block, or a positioning reference signal.

Example 26: The method of any of examples 23 through 25, wherein the second set of one or more signals comprises one or more of a channel state information reference signal, a synchronization signal block, or a positioning reference signal.

Example 27: The method of any of examples 23 through 26, wherein the indication of the association comprises a source identifier and a target identifier.

Example 28: The method of any of examples 23 through 27, wherein the source identifier includes an identifier of the neural network.

Example 29: The method of any of examples 23 through 27, wherein the source identifier includes an identifier of at least the set of trained layers of the neural network.

Example 30: The method of any of examples 23 through 27, wherein the source identifier includes an identifier of a signal or procedure corresponding to at least the first set of one or more signals.

Example 31: The method of any of examples 23 through 30, wherein the target identifier includes an identifier of the second set of one or more signals, a procedure for the second set of one or more signals, or both.

Example 32: The method of any of examples 23 through 31, wherein transmitting the indication of the association comprises: transmitting the indication of the association via a MAC CE, downlink control information, or both.

Example 33: The method of any of examples 23 through 32, wherein the first set of one or more signals corresponds to a first component carrier and the second set of one or more signals corresponds to a second component carrier.

Example 34: The method of any of examples 23 through 33, wherein the first set of one or more signals corresponds to a first band and the second set of one or more signals corresponds to a second band.

Example 35: The method of any of examples 23 through 34, wherein the first set of one or more signals corresponds to a first frequency range and the second set of one or more signals corresponds to a second frequency range.

Example 36: The method of any of examples 23 through 35, wherein the set of trained layers of the neural network comprises one or more residual neural network layers or one or more convolutional neural network layers, or any combination thereof.

Example 46: An apparatus for wireless communication comprising at least one means for performing a method of any one of examples 1 through 22.

Example 47: An apparatus for wireless communication comprising a processor and memory coupled to the processor, the processor and memory configured to perform a method of any one of examples 1 through 22.

Example 48: A non-transitory computer-readable medium storing code for wireless communication, the code comprising instructions executable by a processor to perform a method of any one of examples 1 through 22.

Example 46: An apparatus for wireless communication comprising at least one means for performing a method of any one of examples 23 through 36.

Example 47: An apparatus for wireless communication comprising a processor and memory coupled to the processor, the processor and memory configured to perform a method of any one of examples 23 through 36.

Example 48: A non-transitory computer-readable medium storing code for wireless communication, the code comprising instructions executable by a processor to perform a method of any one of examples 23 through 36.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

training a first set of layers of a neural network based at least in part on channel estimates using a set of resources;

generating a set of weights for the first set of layers of the neural network based at least in part on the training;

receiving, from a first network entity, an indication of an association between a first set of one or more signals and a second set of one or more signals;

receiving the second set of one or more signals from a second network entity; and processing the second set of one or more signals using the set of weights of the first set of layers based at least in part on the association between the first set of one or more signals and the second set of one or more signals, wherein the indication of the association comprises a source identifier and a target identifier.

2. The method of claim 1, further comprising:

transmitting, to the first network entity, an indication of a quantity of layer-states that the UE is capable of storing, tracking, training, processing, or any combination thereof, for one or more of a component carrier, a band, or a band combination.

3. The method of claim 1, wherein processing the second set of one or more signals comprises:

decoding the second set of one or more signals using the set of weights for the first set of layers based at least in part on the association between the first set of one or more signals and the second set of one or more signals.

4. The method of claim 1, wherein processing the second set of one or more signals comprises:

demodulating the second set of one or more signals using the set of weights for the first set of layers based at least in part on the association between the first set of one or more signals and the second set of one or more signals.

5. The method of claim 1, wherein processing the second set of one or more signals comprises:

estimating a downlink channel from the second set of one or more signals using the set of weights for the first set of layers based at least in part on the association between the first set of one or more signals and the second set of one or more signals.

6. The method of claim 1, wherein processing the second set of one or more signals comprises:

compressing the second set of one or more signals using the set of weights for the first set of layers based at least in part on the association between the first set of one or more signals and the second set of one or more signals; and training the first set of layers of the neural network, a second set of layers of the neural network, or both, based at least in part on compressing the second set of one or more signals.

7. The method of claim 1, wherein processing the second set of one or more signals comprises:

training a set of layers of a second neural network using the set of weights for the first set of layers of the neural network based at least in part on the association between the first set of one or more signals and the second set of one or more signals.

8. The method of claim 1, wherein the first set of one or more signals comprises one or more of a channel state information reference signal, a synchronization signal block, or a positioning reference signal, a demodulation reference signal, a tracking signal, a data channel, or a control channel.

9. The method of claim 1, wherein the second set of one or more signals comprises one or more of a channel state information reference signal, a synchronization signal block, or a positioning reference signal, a demodulation reference signal, a tracking signal, a data channel, or a control channel.

10. The method of claim 1, wherein the source identifier includes an identifier of the neural network.

11. The method of claim 1, wherein the target identifier includes an identifier of the second set of one or more signals, a procedure for the second set of one or more signals, or an identifier of a second neural network, or any combination thereof.

12. The method of claim 1, wherein the source identifier includes an identifier of a signal or procedure corresponding to at least the first set of one or more signals, an identifier of at least the first set of layers of the neural network, or any combination thereof.

13. The method of claim 1, wherein the indication of the association is received via higher-layer signals, a medium access control (MAC) control element (CE), downlink control information, or both.

14. The method of claim 1, wherein the first set of one or more signals corresponds to a first component carrier and the second set of one or more signals corresponds to a second component carrier, or the first set of one or more signals corresponds to a first band and the second set of one or more signals corresponds to a second band, or the first set of one or more signals corresponds to a first band combination and the second set of one or more signals corresponds to a second band combination, or the first set of one or more signals corresponds to a first frequency range and the second set of one or more signals corresponds to a second frequency range, or any combination thereof.

15. The method of claim 1, wherein the first set of layers of the neural network comprises one or more residual neural network layers or one or more convolutional neural network layers, or any combination thereof.

16. The method of claim 1, further comprising:

receiving a third set of one or more signals from the second network entity; and processing the third set of one or more signals using the set of weights.

17. The method of claim 1, wherein the second network entity is another UE, a base station, a transmission and reception point, a server, the first network entity or any combination thereof.

18. A method for wireless communications at a network entity comprising:

receiving, from a user equipment (UE) an indication of a set of trained layers of a neural network based at least in part on channel estimates over a set of resources;

identifying a set of weights for the set of trained layers of the neural network based at least in part on the indication of the set of trained layers;

transmitting, to the UE, an indication of an association between a first set of one or more signals and a second set of one or more signals based at least in part on the set of trained layers of the neural network; and transmitting the second set of one or more signals to the UE, wherein the indication of the association comprises a source identifier and a target identifier.

19. The method of claim 18, further comprising:
receiving, from the UE, an indication of a quantity of layer-states that the UE is capable of storing, tracking, training, processing, or any combination thereof, for one or more of a component carrier, a band, or a band combination.

20. The method of claim 18, wherein the first set of one or more signals comprises one or more of a channel state information reference signal, a synchronization signal block, or a positioning reference signal.

21. The method of claim 18, wherein the second set of one or more signals comprises one or more of a channel state information reference signal, a synchronization signal block, or a positioning reference signal.

22. The method of claim 18, wherein the source identifier includes an identifier of the neural network, an identifier of at least the set of trained layers of the neural network, an identifier of a signal or procedure corresponding to at least the first set of one or more signals, or any combination thereof.

23. The method of claim 18, wherein the target identifier includes an identifier of the second set of one or more signals, a procedure for the second set of one or more signals, or both.

24. The method of claim 18, wherein transmitting the indication of the association comprises:
transmitting the indication of the association via a medium access control (MAC) control element (CE), downlink control information, or any combination thereof.

25. The method of claim 18, wherein the first set of one or more signals corresponds to a first component carrier and the second set of one or more signals corresponds to a second component carrier, or the first set of one or more signals corresponds to a first band and the second set of one or more signals corresponds to a second band, or the first set of one or more signals corresponds to a first frequency range and the second set of one or more signals corresponds to a second frequency range, or any combination thereof.

26. The method of claim 18, wherein the set of trained layers of the neural network comprises one or more residual neural network layers or one or more convolutional neural network layers, or any combination thereof.

27. An apparatus for wireless communications at a user equipment (UE), comprising memory coupled to a processor, wherein the processor is configured to:
train a first set of layers of a neural network based at least in part on channel estimates using a set of resources;
generate a set of weights for the first set of layers of the neural network based at least in part on the training;
receive, from a first network entity, an indication of an association between a first set of one or more signals and a second set of one or more signals;
receive the second set of one or more signals from a second network entity; and
process the second set of one or more signals using the set of weights for the first set of layers based at least in part on the association between the first set of one or more signals and the second set of one or more signals,
wherein the indication of the association comprises a source identifier and a target identifier.

28. An apparatus for wireless communications at a network entity comprising memory coupled to a processor, wherein the processor is configured to:
receive, from a user equipment (UE) an indication of a set of trained layers of a neural network based at least in part on channel estimates over a set of resources;
identify a set of weights for the set of trained layers of the neural network based at least in part on the indication of the set of trained layers;
transmit, to the UE, an indication of an association between a first set of one or more signals and a second set of one or more signals based at least in part on the set of trained layers of the neural network; and
transmit the second set of one or more signals to the UE,
wherein the indication of the association comprises a source identifier and a target identifier.

29. The apparatus of claim 27, wherein the source identifier includes an identifier of the neural network, an identifier of a signal or procedure corresponding to at least the first set of one or more signals, an identifier of at least the first set of layers of the neural network, or any combination thereof.

30. The apparatus of claim 27, wherein the target identifier includes an identifier of the second set of one or more signals, a procedure for the second set of one or more signals, or an identifier of a second neural network, or any combination thereof.

* * * * *